US011979818B2

(12) United States Patent
Yu et al.

(10) Patent No.: US 11,979,818 B2
(45) Date of Patent: May 7, 2024

(54) COMMUNICATION METHOD AND COMMUNICATIONS APPARATUS

(71) Applicant: HUAWEI TECHNOLOGIES CO., LTD., Guangdong (CN)

(72) Inventors: Yijun Yu, Shanghai (CN); Longyu Cao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 518 days.

(21) Appl. No.: 17/202,685

(22) Filed: Mar. 16, 2021

(65) Prior Publication Data

US 2021/0204199 A1 Jul. 1, 2021

Related U.S. Application Data

(63) Continuation of application No. PCT/CN2019/102676, filed on Aug. 27, 2019.

(30) Foreign Application Priority Data

Sep. 17, 2018 (CN) .......................... 201811082865.1

(51) Int. Cl.
*H04W 4/00* (2018.01)
*H04W 4/20* (2018.01)
(Continued)

(52) U.S. Cl.
CPC ............. *H04W 48/14* (2013.01); *H04W 4/20* (2013.01); *H04W 48/16* (2013.01)

(58) Field of Classification Search
CPC ........ H04W 48/14; H04W 48/16; H04W 4/20
(Continued)

(56) References Cited

U.S. PATENT DOCUMENTS

| 7,796,514 B2 | 9/2010 | Noriega |
| 2005/0226154 A1 | 10/2005 | Julka et al. |

(Continued)

FOREIGN PATENT DOCUMENTS

| CN | 101431807 A | 5/2009 |
| CN | 102695290 A | 9/2012 |

(Continued)

OTHER PUBLICATIONS

3GPP TS 23.502 V1.4.0 (Dec. 2017), 3rd Generation Partnership Project;Technical Specification Group Services and System Aspects; Procedures for the 5G System; Stage 2(Release 15), 263 pages.

(Continued)

*Primary Examiner* — Temica M Beamer
(74) *Attorney, Agent, or Firm* — WOMBLE BOND DICKINSON (US) LLP

(57) ABSTRACT

This application discloses a communication method and a communications apparatus. A first radio network management function network element that can provide a service-based interface is introduced between an access network element and a core network element. In this way, service invocation may be performed with the access network element by invoking a service-based interface of the first radio network management function network element, and service invocation may also be performed with the core network element by invoking a service-based interface of the first radio network management function network element.

15 Claims, 29 Drawing Sheets

(51) Int. Cl.
*H04W 48/14* (2009.01)
*H04W 48/16* (2009.01)

(58) Field of Classification Search
USPC .......................................................... 455/434
See application file for complete search history.

(56) References Cited

U.S. PATENT DOCUMENTS

| 2017/0244765 | A1 | 8/2017 | Shan et al. | |
|---|---|---|---|---|
| 2018/0359795 | A1* | 12/2018 | Baek ..................... | H04W 76/15 |
| 2019/0053010 | A1* | 2/2019 | Edge ..................... | H04W 4/029 |

FOREIGN PATENT DOCUMENTS

| CN | 103945352 | A | 7/2014 |
|---|---|---|---|
| CN | 107409316 | A | 11/2017 |
| CN | 107409436 | A | 11/2017 |
| WO | 2014110897 | A1 | 7/2014 |
| WO | 2015031690 | A1 | 3/2015 |
| WO | 2017200819 | A1 | 11/2017 |
| WO | 2020034371 | A1 | 2/2020 |

OTHER PUBLICATIONS

ZTE, China Mobile, Deutsche Telekom, KDDI, Update for Solution#18: Further AMF modularization, S2-1813301, SA WG2 Meeting #129bis, Nov. 25-30, 2018, West Palm Beach, Florida, 6 pages.

* cited by examiner

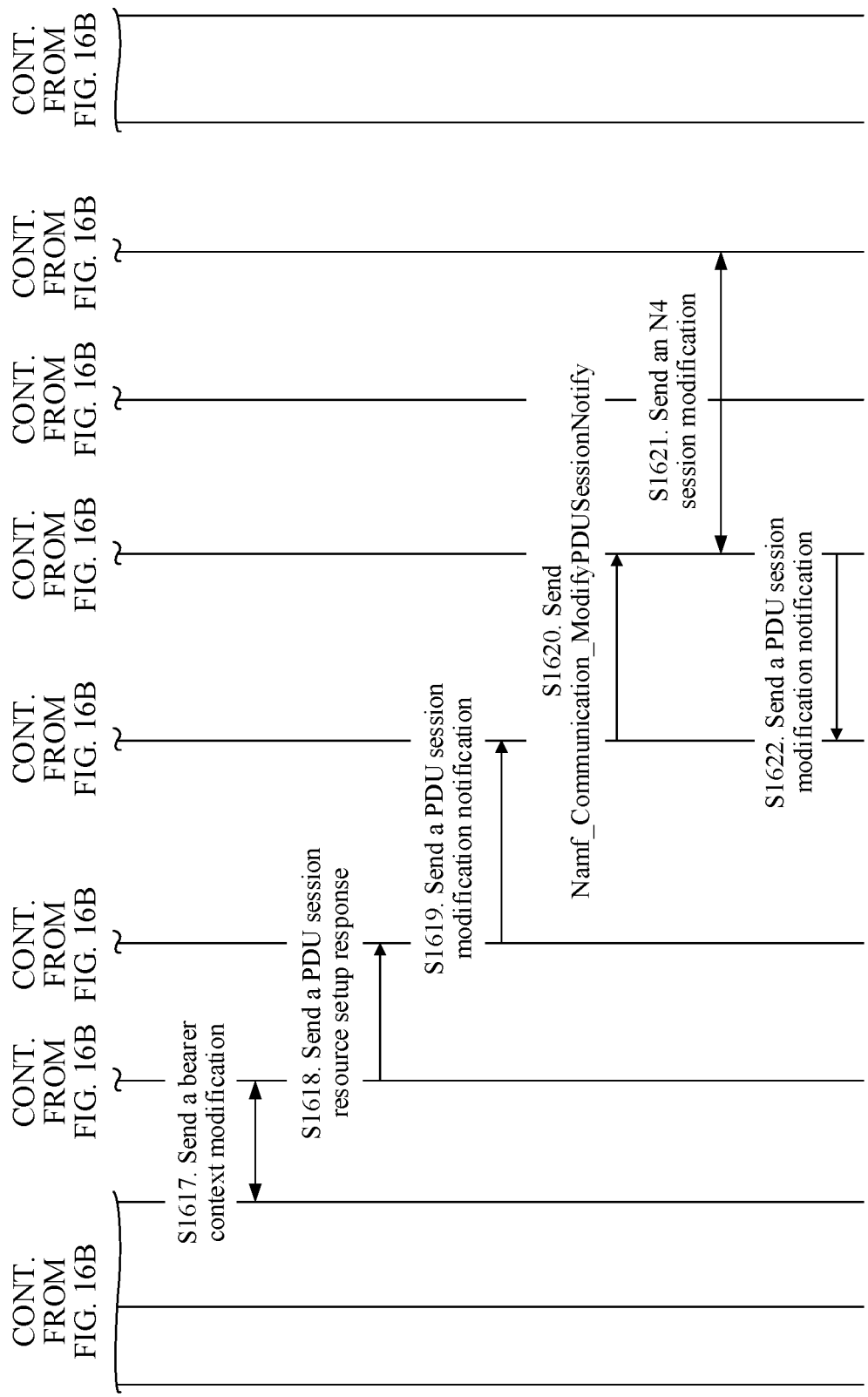

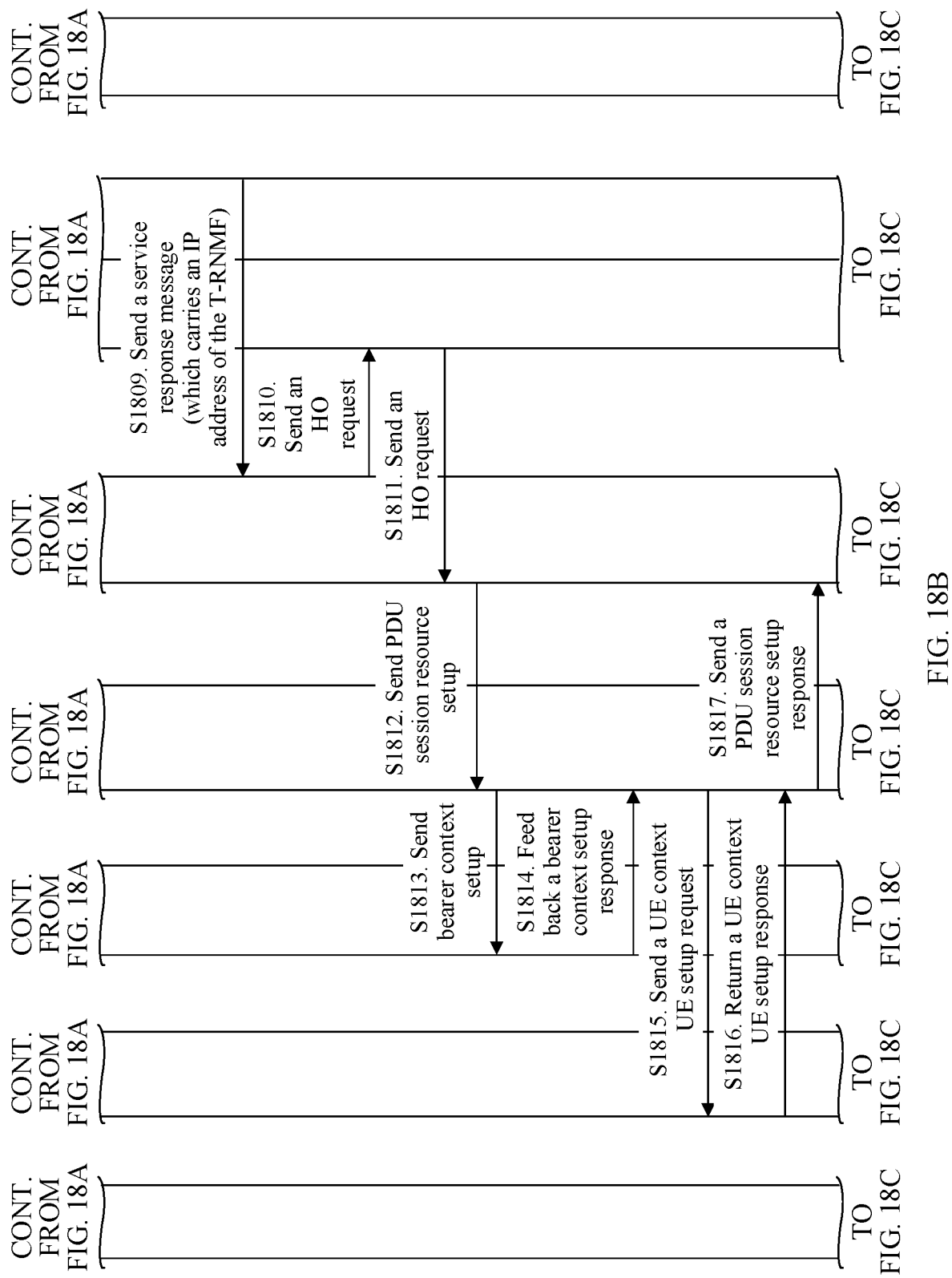

US 11,979,818 B2

COMMUNICATION METHOD AND COMMUNICATIONS APPARATUS

CROSS-REFERENCE TO RELATED APPLICATIONS

This application is a continuation of International Patent Application No. PCT/CN2019/102676, filed on Aug. 27, 2019, which claims priority to Chinese Patent Application No. 201811082865.1, filed on Sep. 17, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In a wireless network, decoupling between network functions is implemented through modularization, and independent capacity expansion, independent evolution, and on-demand deployment may be implemented for decoupled network functions (NF). For example, in a service-based architecture model of a core network, a core network control plane function may be decomposed into a plurality of NF network elements, for example, an access and mobility management function (AMF) network element, a session management function (SMF) network element, an authentication server function (AUSF) network element, and a network repository function (NRF) network element.

Currently, control signaling between a radio access network (Radio Access Network, RAN for short) node and each NF network element in the core network is mainly connected to the AMF through an N2 interface in a unified manner for exchange, and control signaling between RAN nodes is mainly exchanged through an Xn interface. For example, the N2 interface uses an NG interface application protocol (NGAP) and a stream control transmission protocol (SCTP), that is, an NGAP/SCTP protocol processing mechanism; and the Xn interface mainly uses an Xn interface application protocol (XnAP) and an SCTP protocol, that is, an XnAP/SCTP protocol processing mechanism. However, processing of the protocols is relatively complex and redundant. As a result, signaling transmission efficiency is low, and a signaling transmission delay is relatively long.

SUMMARY

To resolve the foregoing problem, embodiments of this application provide a communication method and a communications apparatus in a wireless network, to improve signaling transmission efficiency and reduce a signaling transmission delay.

According to a first aspect, an embodiment of this application provides a communication method, used on a side of a first radio network management function network element, and including: The first radio network management function network element receives information about a first access network element from the first access network element, where the first radio network management function network element supports a function of performing service invocation with a first core network element through a first service-based interface. The first radio network management function network element performs service invocation with the first access network element through a second service-based interface based on the received information about the first access network element. The information about the first access network element includes any one or more of the following information: an identifier of the first access network element, a routing address of the first access network element, a public land mobile network PLMN served by the first access network element, an identifier of a cell served by the first access network element, and a radio access type RAT supported by the first access network element. In this way, the first radio network management function network element that provides a service-based interface is introduced, so that wireless network communication between an access network element and a core network element is simply and conveniently implemented, so as to overcome problems such as low efficiency and a relatively long delay of information transmission due to relatively complex and redundant protocol processing when information is transmitted between the access network element and the core network element through protocol processing, and provide a wireless network communication method with relatively high information transmission efficiency and a relatively short transmission delay.

In an embodiment, the communication method may further include: The first radio network management function network element sends any one or more of the following information to a network repository function network element: an identifier of the first radio network management function network element, a routing address of the first radio network management function network element, a PLMN served by the first radio network management function network element, an identifier of a cell served by the first radio network management function network element, and a RAT supported by the first radio network management function network element. In this way, simple and convenient wireless network communication can be implemented by using the first radio network management function network element that provides a service-based interface, thereby improving information transmission efficiency and reducing an information transmission delay.

In an embodiment, before sending the information to the network repository function network element, the first radio network management function network element may further determine, in one of the following manners, the network repository function network element for receiving the information: In a first manner, the first radio network management function network element determines the network repository function network element based on configuration information in the first radio network management function network element. In a second manner, the first radio network management function network element determines the network repository function network element by querying a domain name system server.

In an embodiment, the communication method provided in an embodiment of the application may further implement a handover for a network element in a wireless network environment. An embodiment may include: The first radio network management function network element receives user equipment measurement information from a second access network element, where the second access network element serves user equipment. The first radio network management function network element determines a target network element based on the user equipment measurement information. The first radio network management function network element receives user equipment context information from the second access network element. The first radio network management function network element sends the user equipment context information to the target network element. In different communication scenarios, the determined target network element may be a third access network element, a second radio network management function network element, or a second core network element. It can be learned that, in an embodiment of the application, the user equipment measurement information may be further obtained through a service-based interface of the first radio network management function network element, and the target network element that serves the user equipment is determined based on the user equipment measurement information, so that the communication method is applicable to a plurality of different communication scenarios, and communication efficiency is improved and a communication delay is reduced in the communication scenarios.

In an embodiment, if the target network element is the second radio network management function network element or the second core network element, manners in which the first radio network management function network element determines the target network element based on the user equipment measurement information may be as follows: In a first possible manner, the first radio network management function network element determines the target network element based on the user equipment measurement information by using the configuration information in the first radio network management function network element. In a second manner, the first radio network management function network element determines the target network element based on the user equipment measurement information by querying the network repository function network element.

According to a second aspect, an embodiment of this application further provides a communication method, used on a side of an access network element, and including: The access network element sends information about the access network element to a radio network management function network element, where the radio network management function network element supports a function of performing service invocation with a core network element through a first service-based interface, and the information about the access network element is used by the radio network management function network element to perform service invocation with the access network element through a second service-based interface. The access network element performs service invocation with the radio network management function network element through the second service-based interface. The information about the access network element includes any one or more of the following information: an identifier of the access network element, a routing address of the access network element, a public land mobile network PLMN served by the access network element, an identifier of a cell served by the access network element, and a radio access type RAT supported by the access network element.

In an embodiment, a manner that is provided in an embodiment of the application and in which the access network element determines the radio network management function network element may be any one of the following manners: In a first manner, the access network element determines the radio network management function network element based on configuration information in the access network element. In a second manner, the access network element determines the radio network management function network element by querying a domain name system DNS server.

Corresponding to some possible communication scenarios, in an embodiment of the application, the access network element may further receive user equipment measurement information from user equipment. In addition, the access network element sends the user equipment measurement information to the radio network management function network element.

According to a third aspect, an embodiment of this application further provides a communication method, used on a side of a network repository function network element of a core network, and the method may include: The network repository function network element receives information about a first radio network management function network element from the first radio network management function network element. The network repository function network element performs service invocation with the first radio network management function network element through a first service-based interface based on the information about the first radio network management function network element. The first radio network management function network element supports a function of performing service invocation with an access network element through a second service-based interface. The information about the first radio network management function network element includes any one or more of the following information: an identifier of the first radio network management function network element, a routing address of the first radio network management function network element, a PLMN served by the first radio network management function network element, an identifier of a cell served by the first radio network management function network element, and a RAT supported by the first radio network management function network element.

In an embodiment, when a target network element that serves user equipment needs to be determined, the network repository function network element may find, for the first radio network management function network element through querying, the target network element that serves the user equipment. In different communication scenarios, the determined target network element may be a second radio network management function network element or a second core network element.

In an embodiment of the application, the first radio network management function network element that can provide a service-based interface is introduced between the access network element and a core network element. In this way, service invocation may be performed with the access network element by invoking a service-based interface of the first radio network management function network element, and service invocation may also be performed with the core network element by invoking a service-based interface of the first radio network management function network element. It can be learned that, the first radio network management function network element that provides a service-based interface is introduced, so that wireless network communication between the access network element and the core network element is simply and conveniently implemented, so as to overcome problems such as low efficiency and a relatively long delay of information transmission due to relatively complex and redundant protocol processing when information is transmitted between the access network element and the core network element through protocol processing, and provide a wireless network communication method with relatively high information transmission efficiency and a relatively short transmission delay.

It should be noted that the communication methods provided in the first aspect, the second aspect, and the third aspect of the embodiments of this application are merely described based on different network element sides of a wireless network. For implementation effects, refer to the foregoing descriptions.

According to a fourth aspect, an embodiment of this application further provides a communications apparatus corresponding to the communication method provided in the first aspect, including: a receiving module, configured to receive information about a first access network element from the first access network element; a processing module, configured to drive to perform service invocation with a first core network element through a first service-based interface, and drive to perform service invocation with the first access network element through a second service-based interface; and a sending module, configured to perform service invocation with the first access network element through the second service-based interface based on the information about the first access network element. The information about the first access network element includes any one or more of the following information: an identifier of the first access network element, a routing address of the first access network element, a public land mobile network PLMN served by the first access network element, an identifier of a cell served by the first access network element, and a radio access type RAT supported by the first access network element.

In an embodiment, the sending module in the apparatus is further configured to send any one or more of the following information to a network repository function network element: an identifier of a first radio network management function network element, a routing address of the first radio network management function network element, a PLMN served by the first radio network management function network element, an identifier of a cell served by the first radio network management function network element, and a RAT supported by the first radio network management function network element.

In an embodiment, the processing module in the apparatus is further configured to determine the network repository function network element based on configuration information in the first radio network management function network element; or the processing module is further configured to determine the network repository function network element by querying a domain name system server.

In an embodiment, the receiving module in the apparatus is further configured to receive user equipment measurement information from a second access network element, where the second access network element serves user equipment; the processing module is further configured to determine a target network element based on the user equipment measurement information; the receiving module is further configured to receive user equipment context information from the second access network element; and the sending module is further configured to send the user equipment context information to the target network element. The target network element may be a third access network element, a second radio network management function network element, or a second core network element.

In an example, if the target network element is the second radio network management function network element or the second core network element, the processing module is configured to: determine the target network element based on the user equipment measurement information by using the configuration information in the first radio network management function network element; or determine the target network element based on the user equipment measurement information by querying the network repository function network element.

According to a fifth aspect, an embodiment of this application further provides a communications apparatus corresponding to the communication method provided in the second aspect, including: a sending module, configured to send information about an access network element to a radio network management function network element, where the information about the access network element is used by the radio network management function network element to perform service invocation with the access network element through a second service-based interface; and a processing module, configured to drive the radio network management function network element to support performing service invocation with a core network element through a first service-based interface, and drive the radio network management function network element to perform service invocation with the access network element through the second service-based interface.

In an embodiment, the information about the access network element includes any one or more of the following information: an identifier of the access network element, a routing address of the access network element, a public land mobile network PLMN served by the access network element, an identifier of a cell served by the access network element, and a radio access type RAT supported by the access network element.

In an embodiment, the processing module in the apparatus is further configured to determine the radio network management function network element based on configuration information in the access network element; or the processing module is further configured to determine the radio network management function network element by querying a domain name system DNS server.

In some communication scenarios, the apparatus may further include a receiving module, configured to receive user equipment measurement information from user equipment; and the sending module is further configured to send the user equipment measurement information to the radio network management function network element.

According to a sixth aspect, an embodiment of this application further provides a communications apparatus corresponding to the communication method provided in the third aspect, including: a receiving module, configured to receive information about a first radio network management function network element from the first radio network management function network element; and a processing module, configured to drive, based on the information about the first radio network management function network element, to perform service invocation with the first radio network management function network element through a first service-based interface. The first radio network management function network element supports a function of performing service invocation with an access network element through a second service-based interface. The information about the first radio network management function network element includes any one or more of the following information: an identifier of the first radio network management function network element, a routing address of the first radio network management function network element, a PLMN served by the first radio network management function network element, an identifier of a cell served by the first radio network management function network element, and a RAT supported by the first radio network management function network element.

In an embodiment, the processing module in the apparatus is further configured to find, for the first radio network management function network element through querying, a target network element that serves user equipment. The target network element may be a second radio network management function network element or a second core network element.

It should be noted that, for implementation effects of the communications apparatuses provided in the fourth aspect, the fifth aspect, and the sixth aspect of the embodiments of this application, refer to the descriptions of the communication methods provided in the first aspect, the second aspect, and the third aspect. Details are not described herein again.

According to a seventh aspect, an embodiment of this application provides a communications apparatus. The communications apparatus has a function of implementing the behavior of the first radio network management function network element in the foregoing methods. The function may be implemented by hardware, or may be implemented by hardware executing corresponding software. The hardware or software includes one or more modules corresponding to the function. In an embodiment, a structure of the communications apparatus includes a processor and a transceiver. The processor is configured to support the communications apparatus performing a corresponding function in the foregoing methods. The transceiver is configured to implement communication between the communications apparatus and an access-network or core network element. The communications apparatus may further include a memory. The memory is configured to be coupled to the processor, and stores a program instruction and data that are necessary for the communications apparatus.

According to an eighth aspect, an embodiment of this application provides a computer-readable storage medium. The computer-readable storage medium stores an instruction. When the instruction is run on a computer, the computer is enabled to perform the methods in the foregoing aspects.

According to a ninth aspect, an embodiment of this application provides a computer program product including an instruction. When the computer program product is run on a computer, the computer is enabled to perform the methods in the foregoing aspects.

According to a tenth aspect, this application provides a chip system. The chip system includes a processor, configured to support the foregoing apparatus or user equipment in implementing the functions in the foregoing aspects, for example, generating or processing the information in the foregoing methods. In an embodiment, the chip system further includes a memory. The memory is configured to store a program instruction and data that are necessary for a data sending device. The chip system may include a chip, or may include a chip and another discrete device.

BRIEF DESCRIPTION OF DRAWINGS

To describe the technical solutions in the embodiments of this application more clearly, the following briefly describes the accompanying drawings for describing the embodiments. It is clear that the accompanying drawings in the following description show merely some embodiments of this application, and an ordinary person skilled in the art may derive other drawings from these accompanying drawings.

FIG. 16A to FIG. 16C are a signaling flowchart of an example 5 of a communication method in a wireless network according to an embodiment of this application;

FIG. 18A to FIG. 18C are a signaling flowchart of an example 7 of a communication method in a wireless network according to an embodiment of this application;

DESCRIPTION OF EMBODIMENTS

The following clearly describes the technical solutions in the embodiments of this application with reference to the accompanying drawings in the embodiments of this application. In description of this application, "/" means "or" unless otherwise specified. For example, AB may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "plurality" means at least two.

In addition, in the embodiments of this application, user equipment is not limited to a 5G network, and includes a mobile phone, an internet of things device, a smart household device, an industrial control device, a vehicle device, and the like. The user equipment may also be referred to as terminal equipment, a mobile station, a mobile, a remote station, a remote terminal, an access terminal, a user terminal, or a user agent. This is not limited herein. Alternatively, the user equipment may be a vehicle in vehicle-to-vehicle (V2V) communication, a machine in machine-type communication, or the like.

In addition, the embodiments of this application are further applicable to another future-oriented communications technology. The network architecture and the service scenario described in this application are intended to describe the technical solutions in this application more clearly, and do not constitute a limitation on the technical solutions provided in this application. One of ordinary skill in the art may know that: With the evolution of the network architecture and the emergence of new service scenarios, the technical solutions provided in this application are also applicable to similar technical problems.

Currently, wireless network communication may be performed between a core network and a radio access network RAN or between two RANs by using a protocol stack.

Figure 1:
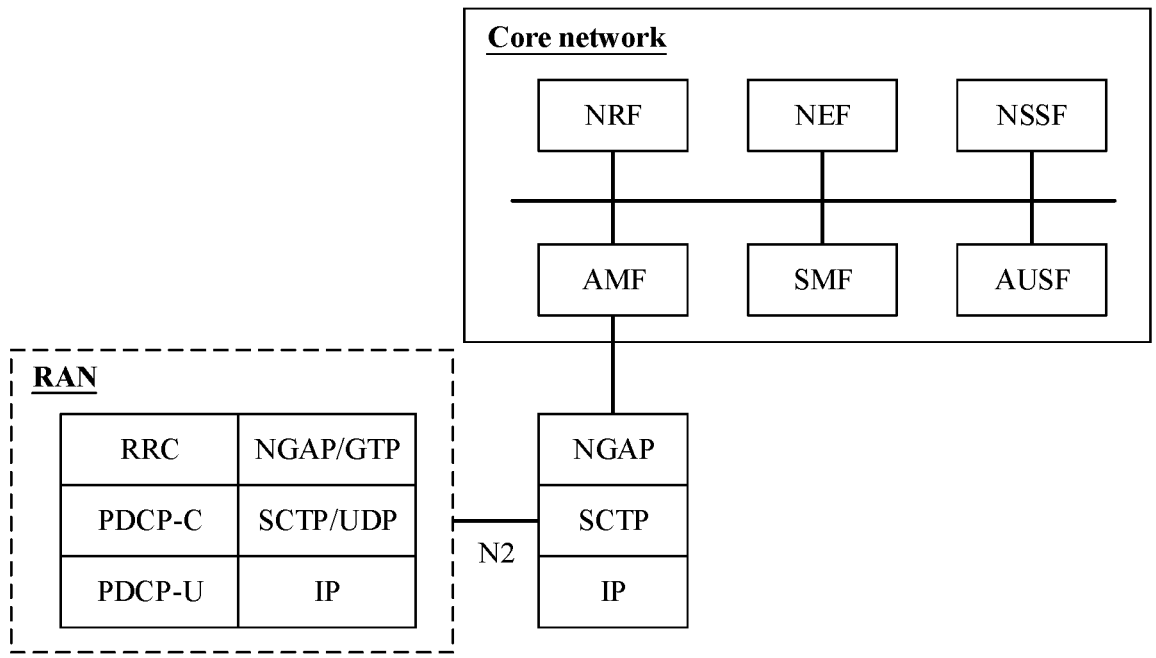
FIG. 1 is a schematic structural diagram of performing communication between a RAN and a core network by using a protocol stack according to an embodiment of this application.

In a case, as shown in FIG. 1, a RAN device is an apparatus configured to provide a wireless communication function for user equipment. The base station may include a macro base station, a micro base station (also referred to as a small cell), a relay station, an access point, and or the like in various forms. In systems that use different radio access technologies, names of a device that has a base station function may be different. For example, in an LTE system, the device is referred to as an evolved NodeB (evolved NodeB, eNB or eNodeB), and in a 3rd generation (3rd Generation, 3G) system, the device is referred to as a NodeB. For example, in an LTE system, the device is referred to as an evolved NodeB (evolved NodeB, eNB or eNodeB); in a 3rd generation (3G) system, the device is referred to as a NodeB; and in a next-generation system, the device is referred to as a gNB (gNodeB).

In FIG. 1, a core network system includes an AMF network element, an SMF network element, an AUSF network element, an NRF network element, a network exposure function (NEF) network element, and a network slice selection function (NSSF) network element.

For example, the AMF network element in the system may be responsible for registration, mobility management, and a tracking area update procedure of the user equipment. The AMF network element may also be referred to as an AMF device or an AMF entity.

The SMF network element in the system may be responsible for session management of the user equipment. For example, the session management includes user plane device selection, user plane device reselection, IP address allocation, QoS control, and session establishment, modification, or release. The SMF network element may also be referred to as an SMF device or an SMF entity.

A network function that can be provided by the AUSF network element in the system includes authentication control on the user equipment. The AUSF network element may also be referred to as an AUSF device or an AUSF entity.

The NRF network element in the system can provide a service discovery function. In an embodiment, the NRF network element can further maintain information about a valid network function network element in the core network. In an embodiment, the NRF network element can further maintain a service supported by a valid network function network element in the core network. The NRF network element may also be referred to as an NRF device or an NRF entity.

A network function that can be provided by the NEF network element in the system includes: externally providing a service and a capability of a network element, an application function, and edge computing. The NEF network element may also be referred to as an NEF device or an NEF entity.

The NSSF network element in the system can select a network slice for the user equipment. The NSSF network element may also be referred to as an NSSF device or an NSSF entity.

The foregoing network elements may be network elements implemented on dedicated hardware; or may be software instances running on dedicated hardware, or instances of virtualized functions on an appropriate platform. For example, the virtualization platform may be a cloud platform.

As shown in FIG. 1, a process in which the RAN and the core network perform wireless network communication by using a protocol stack may be as follows: The RAN connects to the AMF module in the core network through an N2 interface by using an NGAP/SCTP protocol processing mechanism, to perform signaling transmission between the RAN and the core network. For example, when signaling is transmitted from the RAN to the core network, the signaling may be first processed by using an NGAP/SCTP protocol on the RAN side; then processed signaling is sent, through the N2 interface, to an NGAP/SCTP protocol stack corresponding to the core network for processing; finally, signaling processed by the NGAP/SCTP protocol is sent to the AMF module in the core network.

Figure 2:
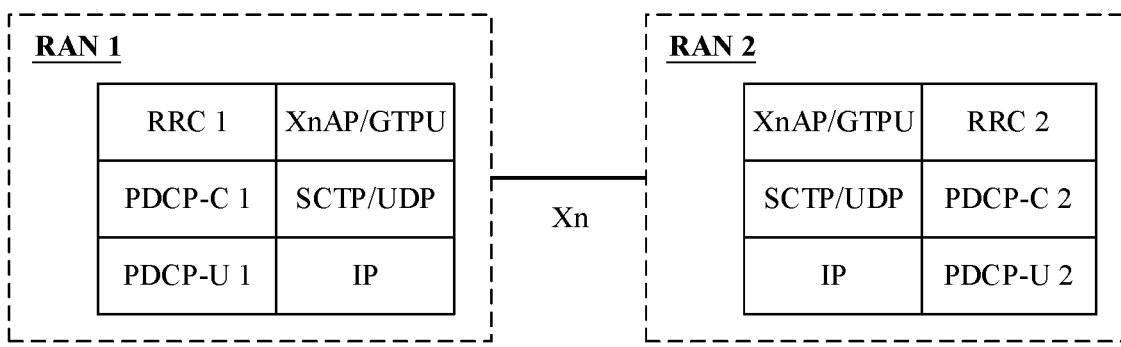
FIG. 2 is a schematic structural diagram of performing communication between two RANs by using a protocol stack according to an embodiment of this application.

In another case, FIG. 2 is a schematic structural diagram of performing wireless network communication between two RANs by using a protocol stack. For details about a RAN 1 device and a RAN 2 device, refer to the descriptions of the RAN in related descriptions of FIG. 1.

In FIG. 2, the RAN 1 includes a radio resource control (RRC) network element, a control plane packet data convergence protocol (PDCP-C) network element, a user plane packet data convergence protocol (PDCP-U) network element, and a service data adaptation protocol (SDAP) network element. It should be noted that the RAN 2 may also include the foregoing network elements included in the RAN 1.

For example, the RRC network element in the system may be responsible for receiving and processing signaling sent by user equipment. The RRC network element may also be referred to as an RRC device or an RRC entity.

The PDCP-C network element in the system may also be responsible for receiving and processing signaling sent by the user equipment, and the like. The PDCP-C network element may also be referred to as a PDCP-C device or a PDCP-C entity.

The PDCP-U network element in the system may be responsible for data encryption and integrity protection. The PDCP-U network element may also be referred to as a PDCP-U device or a PDCP-U entity.

The foregoing network elements may be network elements implemented on dedicated hardware; or may be software instances running on dedicated hardware, or instances of virtualized functions on an appropriate platform. For example, the virtualization platform may be a cloud platform.

A process in which the RAN 1 and the RAN 2 perform wireless network communication by using a protocol stack may be as follows: The RAN 1 connects to the RAN 2 through an Xn interface by using an XnAP/SCTP protocol processing mechanism, to perform signaling transmission between the RAN 1 and the RAN 2. For example, when signaling is transmitted from the RAN 1 to the RAN 2, the RAN 1 may first process the signaling by using an XnAP/SCTP protocol, and then send, through the Xn interface, processed signaling to an XnAP/SCTP protocol in the RAN 2 for processing, and finally, the RAN 2 receives signaling processed by the XnAP/SCTP protocol again. It should be noted that a process of transmitting signaling from the RAN 2 to the RAN 1 is similar to the foregoing process, and details are not described herein again.

To simplify communication between a RAN in an edge network and a core network, functional modules in the core network and the RAN may be virtually defined, and convergently deployed on a unified cloud platform that supports wireless network communication. In this case, if a protocol processing mechanism is still used for signaling transmission between the RAN and the core network or between two RANs that are convergently deployed on the cloud platform, because protocol processing is relatively complex and redundant, problems such as relatively low efficiency and a relatively long delay of signaling transmission between the RAN and the core network or between the two RANs on the same cloud platform may arise.

In view of this, in the embodiments of this application, a first radio network management function (RNMF) network element that can provide a plurality of service-based interfaces is introduced, so that wireless network communication can be performed between a RAN and a core network or between two RANs not only by using a protocol stack, but also by invoking a service-based interface of the first radio network management function network element.

Figure 3:
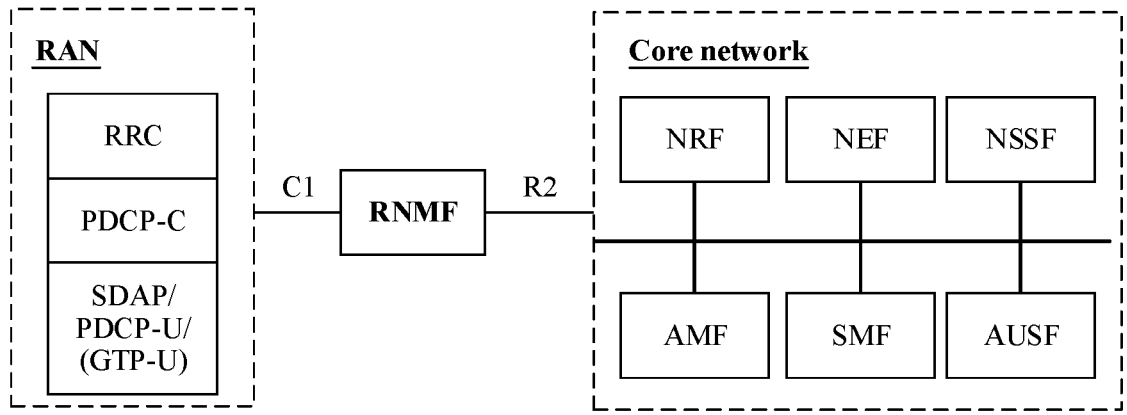
FIG. 3 is a schematic diagram of a network system framework in an application scenario according to an embodiment of this application.

In a scenario of the embodiments of this application, this application may be used in a cloud platform architecture shown in FIG. 3 in which a RAN and a core network are converged. For example, the cloud platform architecture may include an RNMF network element, the RAN, and the core network. For example, a service-based interface provided by the RNMF network element may be an application programming interface (API). Both a C1 interface and an R2 interface in FIG. 3 are service-based API interfaces provided by the RNMF network element. In this case, the RNMF network element supports a function of performing service invocation with a network element in the RAN through the C1 interface, and the RNMF network element also supports a function of performing service invocation with a network element in the core network through the R2 interface. As shown in FIG. 3, core network elements include an NRF network element, an AMF network element, an SMF network element, an NEF network element, an NSSF network element, and an AUSF network element.

It can be understood that, in the scenario, if the RAN needs to transmit signaling to the core network, a communication process may be as follows: An RRC network element in the RAN invokes the C1 interface of the RNMF network element to send the signaling to the RNMF network element, and then the RNMF invokes the R2 interface to transmit the signaling to the AMF network element through a service-based bus of the core network, thereby implementing efficient and fast wireless communication for the signaling between the RAN and the core network. As shown in FIG. 3, the RAN may include the RRC network element, a PDCP-C network element, an SDAP network element, and a PDCP-U network element.

It should be noted that the service-based interfaces provided by the RNMF network element in the scenario, that is, the R2 interface and the C1 interface, may be both API interfaces. However, a service-based interface provided by the RNMF network element on another communications platform may be alternatively any other service-based interface. Any service-based interface that can implement a function of performing service invocation between the RNMF network element and a RAN network element or between the RNMF network element and a core network element belongs to the service-based interface mentioned in the embodiments of this application.

It can be learned that, in an embodiment of the application, the RNMF network element that can provide a service-based interface is introduced between the RAN and the core network, and a function of performing service invocation between a RAN network element and a core network element is implemented by invoking the service-based interface, so that wireless network communication between the core network element and the RAN network element can be implemented, without performing complex and redundant processing by using a protocol stack to perform wireless communication, and a wireless network communication method with high information transmission efficiency and a short transmission delay is provided.

It can be understood that the foregoing scenario is merely an example of a scenario provided in the embodiments of this application, and the embodiments of this application are not limited to the scenario.

The following describes in detail a communication method in a wireless network in the embodiments of this application with reference to the accompanying drawings and by using embodiments.

Figure 4:
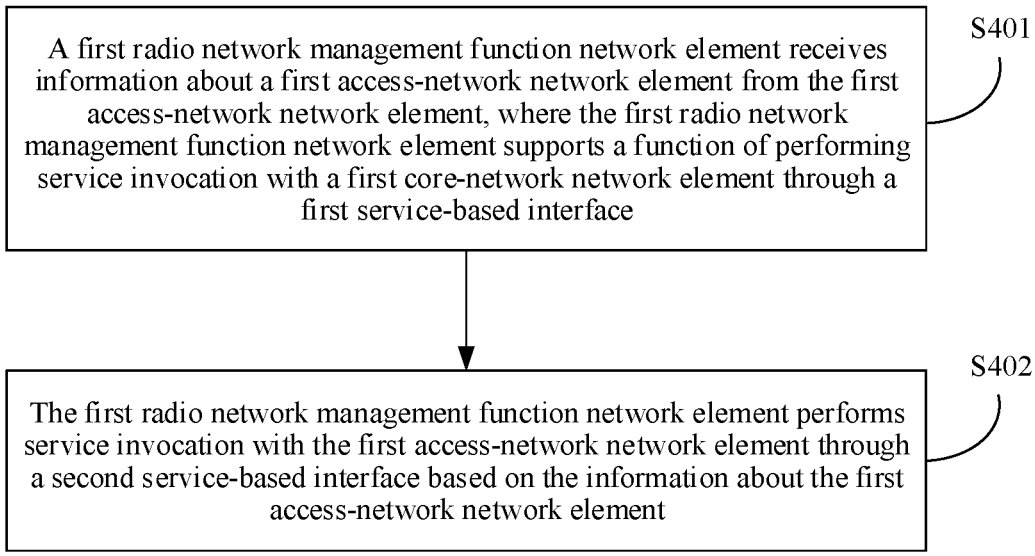
FIG. 4 is a schematic flowchart of a communication method according to an embodiment of this application.

FIG. 4 is a schematic flowchart of a communication method in a wireless network according to an embodiment of the application. Referring to FIG. 4, an embodiment may include the following operations.

S401. A first radio network management function network element receives information about a first access network element from the first access network element, where the first radio network management function network element supports a function of performing service invocation with a first core network element through a first service-based interface.

For example, the first radio network management function network element is a network element that can provide a plurality of service-based interfaces. The first radio network management function network element invokes different service-based interfaces to implement a function of performing service invocation with the first access network element and the first core network element. For example, the first radio network management function network element may invoke the first service-based interface to perform service invocation with the first core network element. For another example, the first radio network management function network element may invoke a second service-based interface to perform service invocation with the first access network element.

It can be understood that the first service-based interface and the second service-based interface are interfaces provided by the first radio network management function network element to perform service invocation with the first core network element and the first access network element. It should be noted that, in various wireless network communication scenarios, in a case, the first radio network management function network element may implement, by invoking a service-based interface, a function of performing service invocation with a core network element and an access network element; in another case, the first radio network management function network element may alternatively implement, by using a protocol stack, a function of performing service invocation with a core network element and an access network element. In an embodiment of the application, a communication mode in which a service-based interface is invoked is used as an example for description.

For example, the first core network element includes but is not limited to an AMF network element, an SMF network element, an AUSF network element, an NRF network element, an NEF network element, and an NSSF network element; and the first access network element includes but is not limited to an RRC network element, a PDCP-C network element, an SDAP network element, and a PDCP-U network element.

For example, in the scenario shown in FIG. 3, the first radio network management function network element may be the RNMF network element, the first access network element may be the RRC network element in the RAN, the first service-based interface may be the R2 interface, and the second service-based interface may be the C1 interface. In this case, operation 401 may be as follows: The RRC network element sends information about the RRC network element to the RNMF network element through the C1, and the RNMF network element receives the information about the RRC network element from the RRC network element. It should be noted that the RNMF network element may send another message to a core network element through the R2 interface.

The information about the first access network element may include any one or more of the following information: an identifier of the first access network element, a routing address of the first access network element, a public land mobile network (Public Land Mobile Network, PLMN for short) served by the first access network element, an identifier of a cell served by the first access network element, and a radio access type (Radio Access Type, RAT for short) supported by the first access network element.

It can be understood that both the identifier of the first access network element and the routing address of the first access network element that are included in the information about the first access network element may be used for message routing for the first access network element, and the public land mobile network PLMN served by the first access network element, the identifier of the cell served by the first access network element, and the radio access type RAT supported by the first access network element that are included in the information may be used to indicate a service capability of the first access network element.

For example, when the first radio network management function network element needs to send a message to a first access network element, the first radio network management function network element may determine a capability of each first access network element based on a PLMN served by the first access network element, an identifier of a cell served by the first access network element, or a radio access type RAT supported by the first access network element that is included in information about the first access network element, to determine an appropriate first access network element as a first access network element to which the message needs to be sent. Then the first radio network management function network element may further determine, based on a routing address of the determined first access network element that is included in information about the first access network element, a delivery address of the message on the first radio network management function network element, that is, send the message to the first access network element indicated by the routing address.

It should be noted that, when the first access network element sends the information about the first access network element to the first radio network management function network element, in a case, the information may be carried in signaling (for example, a registration request), and the signaling is sent to the first radio network management function network element. In this case, the first radio network management function network element needs to parse the received signaling to obtain the information. In another case, alternatively, the information may be directly sent to the first radio network management function network element, that is, the first radio network management function network element receives the information, and does not need to perform other processing to obtain the information.

S402. The first radio network management function network element performs service invocation with the first access network element through the second service-based interface based on the information about the first access network element.

In an embodiment, after receiving the information about the first access network element, the first radio network management function network element may perform service invocation with the first access network element through the second service-based interface based on the information about the first access network element.

For example, in the scenario shown in FIG. 3, the first radio network management function network element may be the RNMF network element, the first access network element may be the RRC network element in the RAN, and the second service-based interface may be the C1 interface. In this case, operation 402 may be as follows: After receiving the information about the RRC network element that is sent by the RRC network element through the C1 interface, the RNMF network element may perform service invocation with the RRC network element through the C1 interface based on the information about the RRC network element.

In an example of a scenario, a wireless communication scenario corresponding to the embodiment shown in FIG. 4 may be a scenario in which an access network element registers with a radio network management function network element. To ensure normal running of a wireless communication service, an access network element may register information about the access network element with a corresponding radio network management function network element, so that the radio network management function network element may select an appropriate access network element from registered access network elements for invocation. For example, the first access network element registers with the first radio network management function network element. This may include the following operations.

S11. The first access network element sends, to the first radio network management function network element, a first registration request that carries the information about the first access network element.

In an example, the first access network element is an access network element to register with the first radio network management function network element. For example, assuming that a first RRC network element, a second RRC network element, and a third RRC network element are access network elements to register with the first radio network management function network element, the first access network element may be the first RRC network element, the second RRC network element, or the third RRC network element.

The first registration request may be an RRC registration request, and the RRC registration request may carry the information about the first access network element. For example, if the first access network element is the first RRC network element, the RRC registration request may carry information about the first RRC network element, and the information may include a first RRC ID, a first RRC IP address, a serving PLMN, a serving cell area, and a serving RAT.

It can be understood that, after receiving a first registration instruction sent by the first access network element, to ensure normal running of a subsequent communication service, the first radio network management function network element may further obtain, by parsing the first registration instruction, the information about the first access network element that is carried in the first registration request, and store the information about the first access network element. The information about the first access network element may be used to indicate the service capability of the first access network element.

S12. The first radio network management function network element generates a first registration response message, and sends the first registration response message to the first access network element through the second service-based interface based on the information about the first access network element.

In response to the received first registration request, the first radio network management function network element may generate the first registration response message, and send the first registration response message to the first access network element.

For example, the first registration response message may carry an identifier that can uniquely identify the first radio network management function network element, for example, an IP address of the first radio network management function network element, to notify the first access network element that registration with the first radio network management function network element is completed.

It should be noted that, for the first access network element that has registered with the first radio network management function network element, the information indicating the service capability of the first access network element is stored in the first radio network management function network element. If the information indicating the service capability of the first access network element changes, the first access network element needs to initiate an information update request to the first radio network management function network element. For a process, refer to the foregoing registration process. The information corresponding to the first access network element that has registered with the first radio network management function network element is updated, to ensure accuracy and validity of a subsequent service.

For a first access network element that needs to register with a radio network management function network element, the radio network management function network element with which the first access network element needs to register needs to be determined before the registration. The first radio network management function network element may be determined in the following two manners.

In an embodiment, the first access network element may determine the first radio network management function network element in configuration information in the first access network element. A process may be as follows: Fixed configuration information is configured for the first access network element by using program code (for example, a routing address of the first radio network management function network element is configured). After power-on, the first access network element may read the configuration information (for example, read the fixedly configured routing address of the first radio network management function network element), to obtain the first radio network management function network element with which the first access network element needs to register.

In an embodiment, the first radio network management function network element may be alternatively obtained by the first access network element by querying a domain name system (DNS) server. A process may be as follows:

Operation 1: The first access network element sends a first DNS query request to the DNS server.

It can be understood that the first DNS query request may carry a type of a queried network element, an identifier of the PLMN served by the first access network element, the identifier of the cell served by the first access network element, and the radio access type RAT supported by the first access network element. For example, the first DNS query request may be a first DNS request, and the first DNS request may carry a type, a serving PLMN, a serving cell area, and a serving RAT.

For example, in a case, a type of a queried target network element may be indicated by a fully qualified domain name (FQDN) of the target network element. For example, a value of the type may be RNMF.cellid.RATx.y (corresponding to an FQDN of the first radio network management function network element). In another case, alternatively, the type may be directly indicated by a name of the target network element. For example, a value of the type may be an RNMF. The RAT type supported by the first access network element may be one or more of GERAN-supported, UTRAN-supported, E-UTRAN-supported, and 5G NR-supported, or may be a new RAT type obtained by combining the foregoing types. For example, the RAT type may be a new RAT type, that is, GERAN/UTRAN-supported, formed by combining the GERAN-supported and UTRAN-supported types. For another example, the RAT type may be a new RAT type, that is, E-UTRAN/5G NR-supported, formed by combining the E-UTRAN-supported and 5G NR-supported types.

Operation 2: The DNS server selects and determines, based on the received first DNS query request, an appropriate first radio network management function network element as a discovered first radio network management function network element.

It should be noted that the appropriate first radio network management function network element is a first radio network management function network element corresponding to the PLMN and/or the cell that can be served by the first access network element and the RAT type supported by the first access network element. In an embodiment, the DNS server may search related information of all first radio network management function network elements configured on the DNS server for a radio network management function network element that meets a requirement in the received first DNS query request, and use the radio network management function network element as the discovered first radio network management function network element.

Operation 3: The DNS server feeds back the first radio network management function network element to the first access network element. For example, the DNS server may add related information of the first radio network management function network element to a first DNS query response, and feed back the first DNS query response to the first access network element.

It can be understood that, after determining the discovered first radio network management function network element, the DNS server may search the related information of the first radio network management function network element configured on the DNS server for a routing address of the discovered first radio network management function network element; add, to the first DNS query response, the related information of the discovered first radio network management function network element that includes the routing address of the first radio network management function network element; and return the first DNS query response to the first access network element. In this way, the first access network element discovers the first radio network management function network element by dynamically querying the DNS server.

Figure 5:
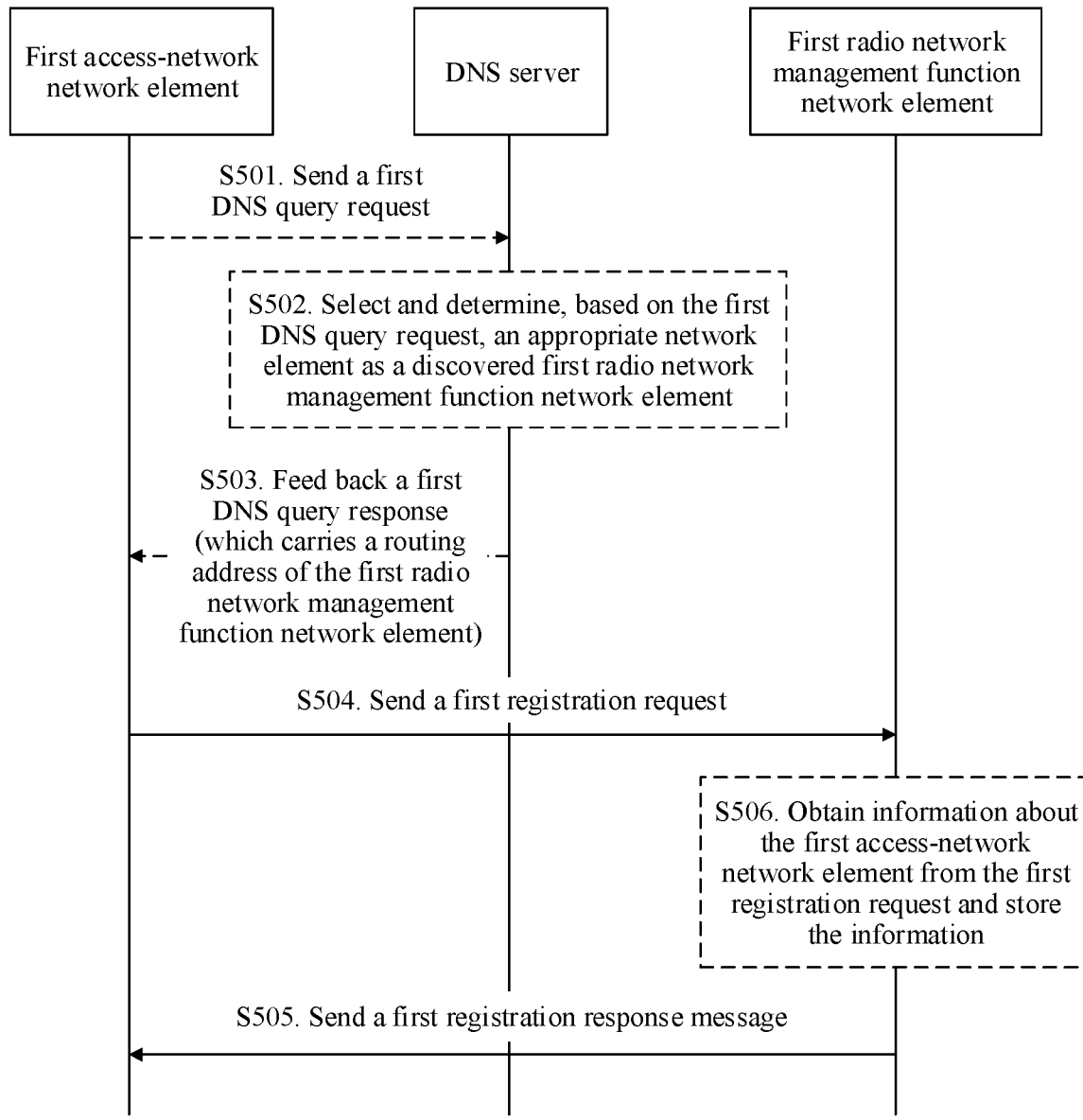
FIG. 5 is a signaling flowchart in which a first access network element registers with a first radio network management function network element according to an embodiment of this application.

To more clearly describe a process in which a first access network element registers with a first radio network management function network element, in an example, FIG. 5 is a signaling flowchart of a method for registering with a first radio network management function network element by a first access network element according to an embodiment. For example, the first access network element queries a DNS server to determine the first radio network management function network element, and a process in which the first access network element registers with the corresponding first radio network management function network element may include the following operations.

S501. The first access network element sends a first DNS query request to the DNS server.

S502. The DNS server selects and determines, based on the received first DNS query request, an appropriate first radio network management function network element as a discovered first radio network management function network element.

S503. The DNS server feeds back a first DNS query response to the first access network element, where the first DNS query response carries related information of the first radio network management function network element.

It can be understood that S501 to S503 are a process in which the first access network element determines the first radio network management function network element by querying the DNS server. For related descriptions, refer to the descriptions of "operation 1" to "operation 3" in the example of this scenario. Details are not described herein again.

It should be noted that S501 to S503 are optional operations, and the first radio network management function network element may be alternatively determined in an embodiment. This is not limited in this embodiment.

S504. The first access network element sends, to the first radio network management function network element, a first registration request that carries information about the first access network element.

S505. The first radio network management function network element generates a first registration response message, and sends the first registration response message to the first access network element through a second service-based interface based on the information about the first access network element.

It should be noted that, for an embodiment of S504 and S505, refer to the related descriptions of S11 and S12. Details are not described herein again.

In an embodiment, between S504 and S505, the method may further include the following operation.

S506. The first radio network management function network element obtains the information about the first access network element from the first registration request and stores the information.

For example, in the scenario shown in FIG. 3, the RRC network element may query the DNS server to determine the RNMF network element; then the RRC network element adds information about the RRC network element to a first registration request, and sends the first registration request to the determined RNMF network element through the C1 interface based on a routing address of the corresponding RNMF network element; after receiving the first registration request, the RNMF network element may parse the first registration request to obtain the information about the RRC network element; and then the RNMF network element sends a generated first registration response message to the RRC network element through the C1 interface based on the information about the RRC network element, to complete registration of the RRC network element with the RNMF network element.

In the process shown in FIG. 5 in which the first access network element registers with the first radio network management function network element, the registration of the first access network element with the first radio network management function network element is completed. This provides a selection resource and a selection basis for the first radio network management function network element to select and invoke an access network element in a subsequent communication service.

In another example of a wireless communication scenario, an access network element needs to register with a corresponding radio network management function network element, and the radio network management function network element also needs to register with a corresponding core network element, so that the core network element may select, for invocation, an appropriate radio network management function network element from radio network management function network elements that have registered with the core network element. For example, the first radio network management function network element registers with a network repository function NRF network element in a core network. This may include the following operations.

S21. The first radio network management function network element sends a second registration request to the NRF network element.

In an example, the first radio network management function network element is a network management function network element that is to register with the NRF network element. For example, assuming that a first RNMF network element, a second RNMF network element, and a third RNMF network element are network management function network elements that are to register with the NRF network element, the first radio network management function network element may be the first RNMF network element, the second RNMF network element, or the third RNMF network element.

It can be understood that the second registration request is used to request to register the first radio network management function network element with the corresponding NRF network element, and notify the NRF network element of a service capability of the first radio network management function network element that is to perform registration. The second registration request may carry related information of the first radio network management function network element. For example, the related information may include but is not limited to an identifier of the first radio network management function network element, a routing address of the first radio network management function network element, a PLMN served by the first radio network management function network element, an identifier of a cell served by the first radio network management function network element, and a RAT supported by the first radio network management function network element.

Both the identifier of the first radio network management function network element and the routing address of the first radio network management function network element may be used for message routing for the first radio network management function network element. The PLMN served by the first radio network management function network element, the identifier of the cell served by the first radio network management function network element, and the RAT supported by the first radio network management function network element may be used to indicate the service capability of the first radio network management function network element.

For example, when the NRF network element needs to send a message to a first radio network management function network element, the NRF network element may determine a capability of each first radio network management function network element based on a PLMN served by the first radio network management function network element, an identifier of a cell served by the first radio network management function network element, or a RAT supported by the first radio network management function network element that is included in related information of the first radio network management function network element, to determine an appropriate first radio network management function network element as a first radio network management function network element to which the message needs to be sent. Then the NRF network element may further determine, based on a routing address of the determined first radio network management function network element that is included in the related information of the first radio network management function network element, a delivery address of the message on the NRF network element, that is, send the message to the first radio network management function network element indicated by the routing address.

For example, the second registration request may be an RNMF registration request, and the RNMF registration request may carry the related information of the first radio network management function network element. For example, if the first radio network management function network element is the first RNMF network element, the RNMF registration request may carry related information of the first RNMF network element, and the related information may include a first RNMF ID, a first RNMF IP address, a serving PLMN, a serving cell area, and a serving RAT.

It can be understood that, after receiving a second registration instruction sent by the first radio network management function network element, to ensure normal running of a subsequent communication service, the NRF network element may further obtain, by parsing the second registration instruction, the related information of the first radio network management function network element that is carried in the second registration request, and store the related information of the first radio network management function network element. The related information of the first radio network management function network element may be used to indicate the service capability of the first radio network management function network element.

S22. The NRF network element sends a second registration response message to the first radio network management function network element.

In response to the received second registration request, the NRF network element may generate the second registration response message, and send the second registration response message to the first radio network management function network element.

For example, the second registration response message may carry an identifier that can uniquely identify the NRF network element, for example, an IP address of the NRF network element, to notify the first radio network management function network element that registration with the NRF network element is completed.

It should be noted that, for the first radio network management function network element that has registered with the NRF network element, the related information indicating the service capability of the first radio network management function network element is stored in the NRF network element. If the related information indicating the service capability of the first radio network management function network element changes, the first radio network management function network element needs to initiate an information update request to the NRF network element. For a process, refer to the foregoing registration process. The related information corresponding to the first radio network management function network element that has registered with the NRF network element is updated, to ensure accuracy and validity of a subsequent service.

For a first radio network management function network element that needs to register with an NRF network element, the NRF network element with which the first radio network management function network element needs to register needs to be determined before the registration. The NRF network element may be determined in the following two manners.

In an embodiment, the first radio network management function network element may determine the NRF network element in configuration information in the first radio network management function network element. A process may be as follows: Fixed configuration information is configured for the first radio network management function network element by using program code (for example, a routing address of the NRF network element is configured). After power-on, the first radio network management function network element may read the configuration information (for example, read the fixedly configured routing address of the NRF network element), to obtain the NRF network element with which the first radio network management function network element needs to register.

In an embodiment, the NRF network element may be alternatively obtained by the first radio network management function network element by querying the DNS server. A process may be as follows:

Operation 1: The first radio network management function network element sends a second DNS query request to the DNS server.

It can be understood that the second DNS query request may carry a type of a queried network element, an identifier of the PLMN served by the first radio network management function network element, the identifier of the cell served by the first radio network management function network element, and the RAT type supported by the first radio network management function network element. For example, the second DNS query request may be a second DNS request, and the second DNS request may carry a type, a serving PLMN, a serving cell area, and a serving RAT.

For example, in a case, the type (type) of the queried network element may be indicated by an FQDN of the network element. For example, a value of the type may be NRF.cellid.PLMNid.y (corresponding to an FQDN of the NRF network element). In another case, alternatively, the type may be directly indicated by a name of the network element. For example, a value of the type may be an NRF.

Operation 2: The DNS server selects and determines, based on the received second DNS query request, an appropriate NRF network element as a discovered NRF network element.

It should be noted that the appropriate NRF network element is an NRF network element corresponding to the PLMN and/or the cell that can be served by the first radio network management function network element and the RAT type supported by the first radio network management function network element. In an embodiment, the DNS server may search related information of all NRF network elements configured on the DNS server for an NRF network element that meets a requirement in the received second DNS query request, and use the NRF network element as the discovered NRF network element.

Operation 3: The DNS server feeds back the NRF network element to the first radio network management function network element. For example, the DNS server may add related information of the NRF network element to a second DNS query response, and feed back the second DNS query response to the first radio network management function network element.

It can be understood that, after determining the discovered NRF network element, the DNS server may search the related information of the NRF network element configured on the DNS server for a routing address of the discovered NRF network element; add, to the second DNS query response, the related information of the discovered NRF network element that includes the routing address of the NRF network element; and return the second DNS query response to the first radio network management function network element. In this way, the first radio network management function network element discovers the NRF network element by dynamically querying the DNS server.

Figure 6:
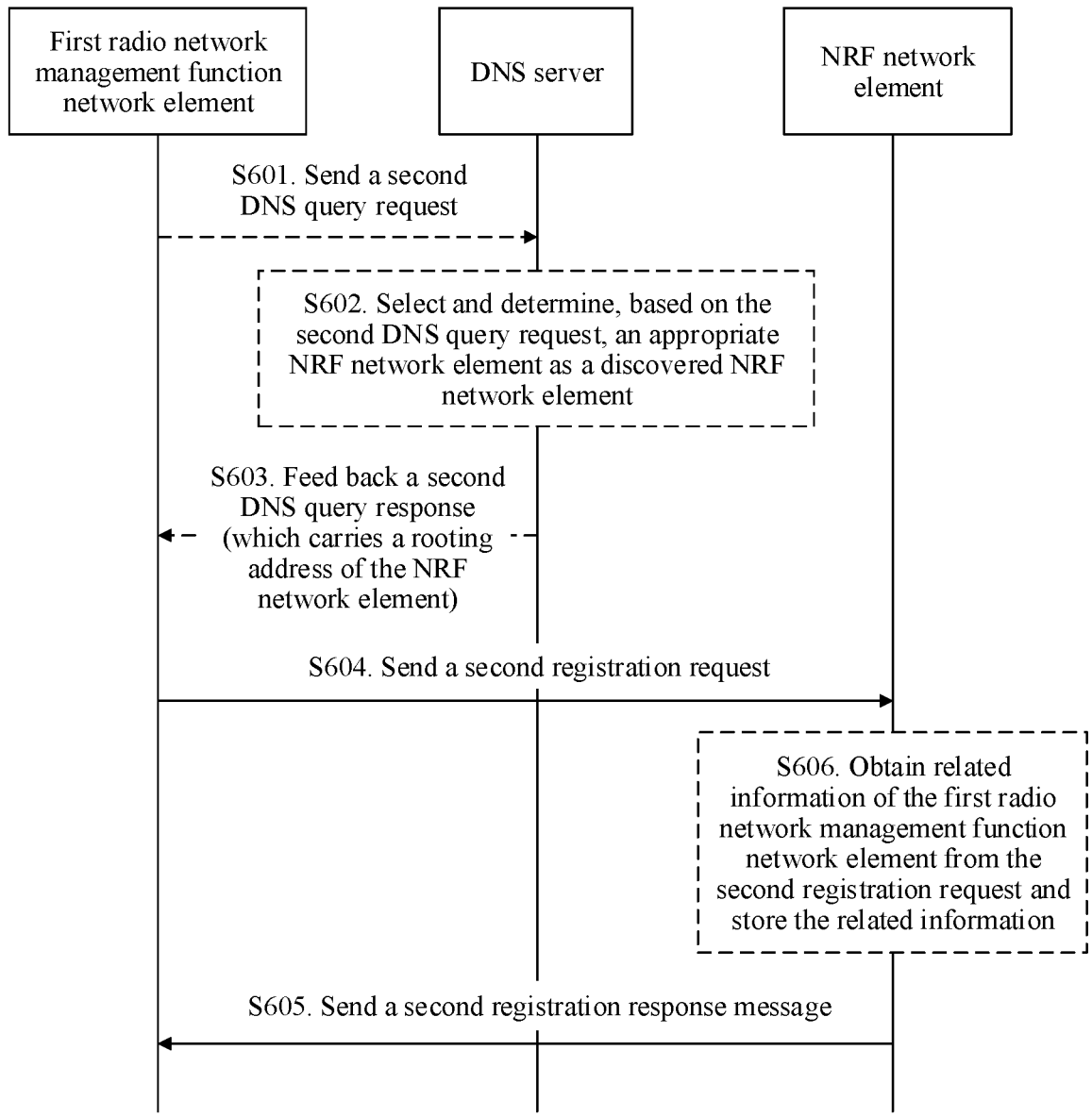
FIG. 6 is a signaling flowchart in which a first radio network management function network element registers with an NRF network element according to an embodiment of this application.

To more clearly and completely describe a process in which a first radio network management function network element registers with an NRF network element, in an example, FIG. 6 is a signaling flowchart of a method for registering with an NRF network element by a first radio network management function network element according to an embodiment. For example, the first radio network management function network element queries a DNS server to determine the NRF network element, and a process in which the first radio network management function network element registers with the corresponding NRF network element may include the following operations.

S601. The first radio network management function network element sends a second DNS query request to the DNS server.

S602. The DNS server selects and determines, based on the received second DNS query request, an appropriate NRF network element as a discovered NRF network element.

S603. The DNS server feeds back a second DNS query response to the first radio network management function network element, where the second DNS query response carries related information of the NRF network element.

It can be understood that S601 to S603 are a process in which the first radio network management function network element determines the NRF network element by querying the DNS server. For related descriptions, refer to the descriptions of "operation 1" to "operation 3" in the example of this scenario. Details are not described herein again.

It should be noted that S601 to S603 are optional operations, and the NRF network element may be alternatively determined in an embodiment. This is not limited in this embodiment.

S604. The first radio network management function network element sends a second registration request to the NRF network element.

S605. The NRF network element sends a second registration response message to the first radio network management function network element.

It should be noted that, in an embodiment of S604 and S605, refer to the related descriptions of S21 and S22. Details are not described herein again.

In an embodiment, between S604 and S605, the method may further include the following operation.

S606. The NRF network element obtains related information of the first radio network management function network element from the second registration request and stores the related information.

For example, in the scenario shown in FIG. 3, the RNMF network element may query the DNS server to determine the NRF network element; then the RNMF network element adds related information of the RNMF network element to a second registration request, and sends the second registration request to the determined NRF network element through the R2 interface based on a routing address of the corresponding NRF network element; after receiving the second registration request, the NRF network element may parse the second registration request to obtain the related information of the RNMF network element; and then the NRF network element sends a generated second registration response message to the RNMF network element through the R2 interface based on the related information of the RNMF network element, to complete registration of the RNMF network element with the NRF network element.

In the process shown in FIG. 6 in which the first radio network management function network element registers with the NRF network element, the registration of the first radio network management function network element with the NRF network element is completed. This provides a selection resource and a selection basis for the NRF network element to select and invoke the first radio network management function network element in a subsequent communication service.

Figure 7:
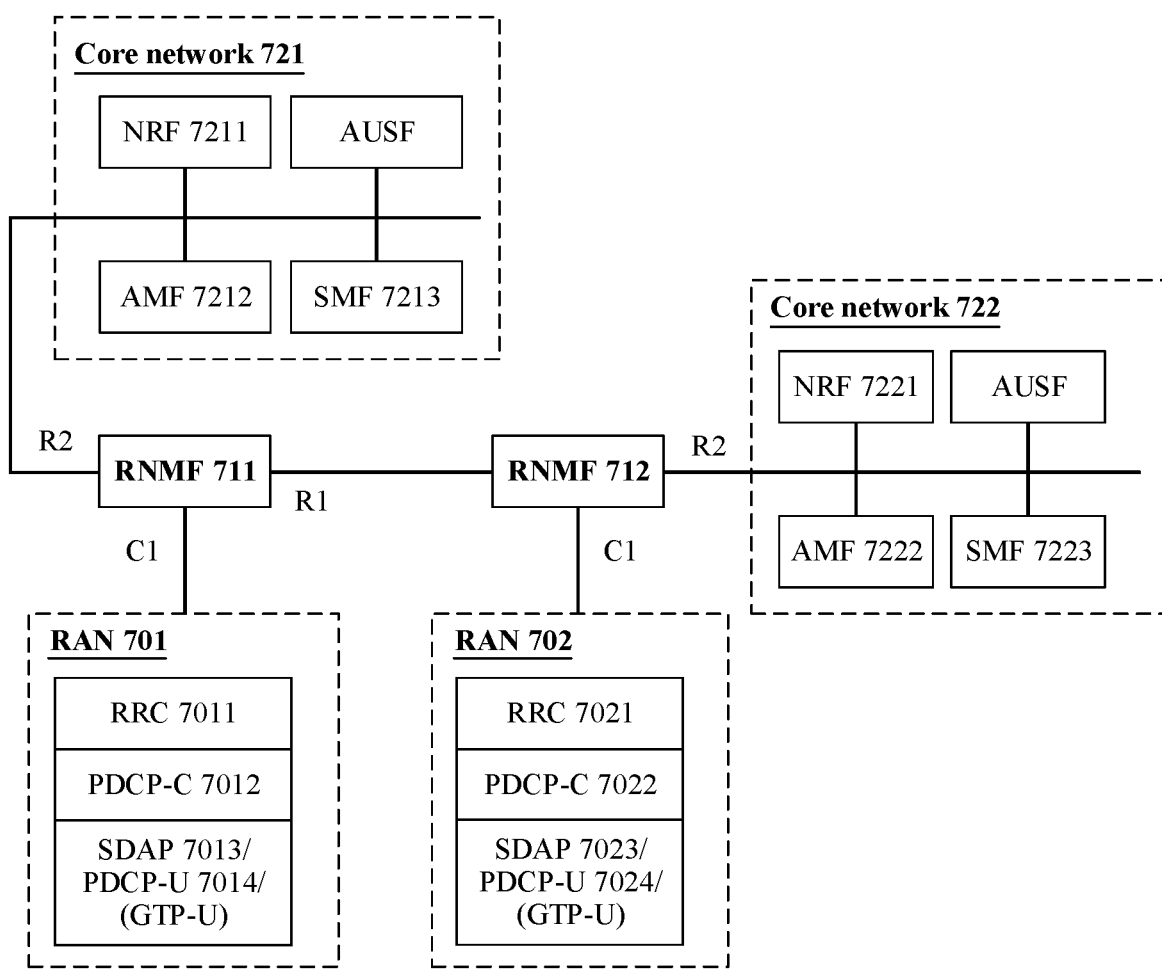
FIG. 7 is a schematic diagram of a network system framework in another application scenario according to an embodiment of this application.

In addition to the system architecture shown in FIG. 3, the embodiments of this application may be further used in an architecture shown in FIG. 7. FIG. 7 is a schematic diagram of a network system framework in another application scenario according to an embodiment of this application. In the scenario, a plurality of RANs, a plurality of RNMF network elements, and a plurality of core networks may be included. For example, as shown in FIG. 7, a RAN 701, a RAN 702, an RNMF 711, an RNMF 712, a core network 721, and a core network 722 may be included. The RAN 701 may include an RRC 7011, a PDCP-C 7012, an SDAP 7013, and a PDCP-U 7014. The RAN 702 may include an RRC 7021, a PDCP-C 7022, an SDAP 7023, and a PDCP-U 7024. The core network 721 may include an NRF 7211, an AMF 7212, and an SMF 7213. The core network 722 may include an NRF 7221, an AMF 7222, and an SMF 7223.

It can be understood that an RNMF network element in FIG. 7 provides a C1 interface, an R1 interface, and an R2 interface, which may all be service-based API interfaces provided by the RNMF network element. In this case, the RNMF network element supports a function of performing service invocation with a network element in a RAN through the C1 interface, the RNMF network element also supports a function of performing service invocation with a network element in a core network through the R2 interface, and service invocation may be performed between two RNMF network elements through the R1 interface.

It should be noted that, in the scenario, an RRC network element in a RAN can be connected to only one RNMF network element, but each RNMF network element may be connected to RRC network elements in a plurality of RANs. In addition, wireless network communication may be implemented between a RAN and a core network by invoking a plurality of RNMF network elements. As shown in FIG. 7, the RRC 7011 in the RAN 701 needs to invoke both the RNMF 711 and the RNMF 712 to communicate with the AMF 7212 in the core network 721.

Figure 8:
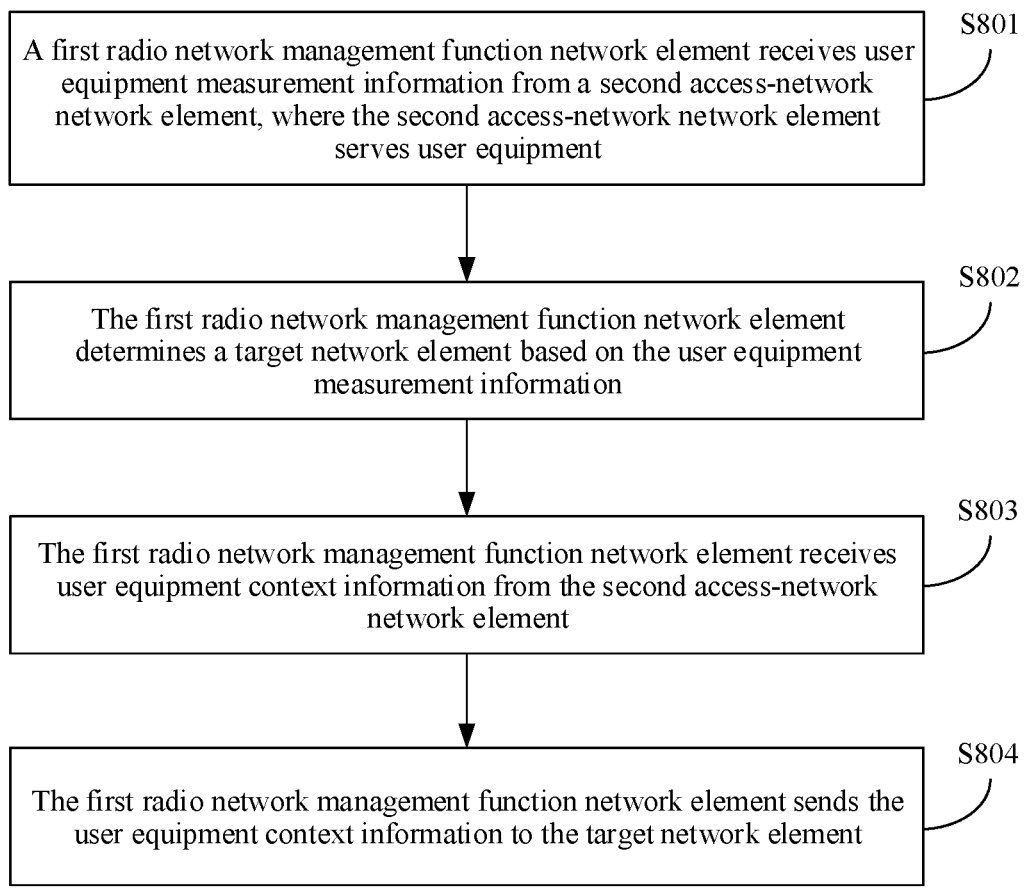
FIG. 8 is a schematic flowchart of a handover for a network element according to an embodiment of this application.

It can be understood that, considering a requirement of the communication scenario shown in FIG. 7, an embodiment of this application further provides a communication method in a communication scenario in which a handover needs to be performed for a network element, so that when communication quality in a current wireless network deteriorates due to movement of user equipment, the user equipment is handed over to a wireless network that can provide better communication quality, to achieve a good communication effect. FIG. 8 is a schematic flowchart of a communication method for performing a handover for a network element according to an embodiment of this application. As shown in FIG. 8, an embodiment of the application may include the following operations.

S801. A first radio network management function network element receives user equipment measurement information from a second access network element, where the second access network element serves user equipment.

It can be understood that the user equipment measurement information is a measurement result obtained by the user equipment by performing signal measurement by using a currently connected wireless network, where the currently connected wireless network includes the second access network element that currently serves the user equipment. The user equipment measurement information may be used to indicate a network environment in which the user equipment is currently located, for example, a cell in which the user equipment is currently located.

In an embodiment, after obtaining the user equipment measurement information through signal measurement, the user equipment may report the obtained user equipment measurement information to the second access network element, that is, a source access network element for the user equipment before a handover. Then, after receiving the user equipment measurement information, the second access network element sends the user equipment measurement information to the first radio network management function network element.

In an example, the user equipment measurement information may carry any one or more of the following information: a measurement type (for example, an RSRP, an RSRQ, an RSTD, a UTRAN TDD P-CCPCH RSCP, or a UTRAN FDD CPICH), a measurement period, and the number of frequencies.

S802. The first radio network management function network element determines a target network element based on the user equipment measurement information.

The target network element is a network element to which the user equipment needs to be handed over, and serves the user equipment after the handover. In an embodiment, the target network element may be one or more of an access network element, a radio network management function network element, and a core network element. For example, the target network element may be a third access network element, a second radio network management function network element, or a second core network element. A type of the target network element and a network element to which the user equipment is to be handed over may be determined by the first radio network management function network element based on the received user equipment measurement information.

In an embodiment, the first radio network management function network element may determine, based on first user equipment measurement information, a cell in which the user equipment is currently located, where the cell is denoted as a target cell (target ID). Then the first radio network management function network element may determine, based on the target cell, a type of a network element for which a handover needs to be performed and a network element to which the user equipment is to be handed over. The type of the network element for which a handover needs to be performed is determined among an access network element, an RNMF network element, and a core network element according to the following determining criteria:

1. A condition for determining whether a handover needs to be performed for an access network element is as follows: The first radio network management function network element checks whether the target cell (target ID) to which the UE is to be handed over is within a range of a cell served by an access network element that currently serves the UE. If yes, no handover needs to be performed for the access network element; otherwise, a handover needs to be performed for the access network element.

2. A condition for determining whether a handover needs to be performed for the first radio network management function network element is as follows: The first radio network management function network element checks whether the target cell is a cell that can be served by the first radio network management function network element. If yes, no handover needs to be performed for the first radio network management function network element; otherwise, a handover needs to be performed for the first radio network management function network element.

3. A condition for determining whether a handover needs to be performed for a core network element is as follows: In a case, if the first radio network management function network element locally stores information about a cell served by the core network element, the first radio network management function network element checks whether a cell corresponding to the target ID (identifier) is the cell served by the core network element (for example, an AMF network element). If yes, no handover needs to be performed for the core network element; otherwise, a handover needs to be performed for the core network element. In another case, if the first radio network management function network element does not locally store the information about the cell served by the core network element, the first radio network management function network element needs to query an NRF network element for related information of the core network element, that is, request an AMF service from the NRF network element by using the target ID. Further, the first radio network management function network element determines whether an AMF service address returned by the NRF network element is the same as an address of the current serving core network element. If yes, no handover needs to be performed for the core network element; otherwise, a handover needs to be performed for the core network element.

In an example, after determining the type of the network element for which a handover needs to be performed, the first radio network management function network element may further determine, based on the user equipment measurement information by using configuration information in the first radio network management function network element, a network element, of the type, to which the user equipment needs to be handed over.

In another example, after determining the type of the network element for which a handover needs to be performed, the first radio network management function network element may further determine, based on the user equipment measurement information by querying the NRF network element, a network element, of the type, to which the user equipment needs to be handed over.

For example, assuming that the first radio network management function network element determines, based on the user equipment measurement information, that the network element for which a handover needs to be performed is a radio network management function network element, the first radio network management function network element may further determine, based on the user equipment measurement information by using the configuration information in the first radio network management function network element, that a radio network management function network element to which the user equipment needs to be handed over is the second radio network management function network element.

For example, assuming that the first radio network management function network element determines, based on the user equipment measurement information, that the network element for which a handover needs to be performed is a core network element, the first radio network management function network element may further determine, based on the user equipment measurement information by querying the NRF network element, that a core network element to which the user equipment needs to be handed over is the second core network element.

S803. The first radio network management function network element receives user equipment context information from the second access network element.

After the target network element for the handover is determined, to ensure normal wireless network communication after the handover, the source access network element (that is, the second access network element) needs to send the user equipment context information to the first radio network management function network element.

It can be understood that the user equipment context information may be, for example, a UE context, and the UE context may carry at least one or more of the following information: a UE-AMBR, AS security information (a key), a PDU session resource to be setup list, an RRC context, a mobility restriction list, and the like. For example, the PDU session resource to be setup list is configuration information of a PDU session that needs to be reestablished, and may include parameter information such as a PDU session ID, a PDU session resource AMBR, a UL NG-U address, a security indication, a PDU session type, and QoS.

In an example, the user equipment context information may be carried in a handover request (HO request) of the user equipment together with information such as the target ID, a UE ID, and a GUAMI, and the second access network element sends the handover request to the first radio network management function network element through a service-based interface.

In another example, alternatively, the user equipment context information may not be carried in other signaling, but is directly sent by the second access network element to the first radio network management function network element through a service-based interface in a form of the user equipment context information.

S804. The first radio network management function network element sends the user equipment context information to the target network element.

an embodiment, after receiving the user equipment context information, the first radio network management function network element may directly send the user equipment context information to the target network element, to notify the target network element of related information of the currently served user equipment.

It can be understood that, after obtaining the user equipment context information, the target network element may perform operations such as establishing a target network element context for the user equipment, allocating a DRB ID to a PDU session, selecting a corresponding network element based on the target ID, and sending a PDU session resource message to the corresponding network element, to hand over the user equipment from a source wireless network to a wireless network including the target network element.

Figure 9:
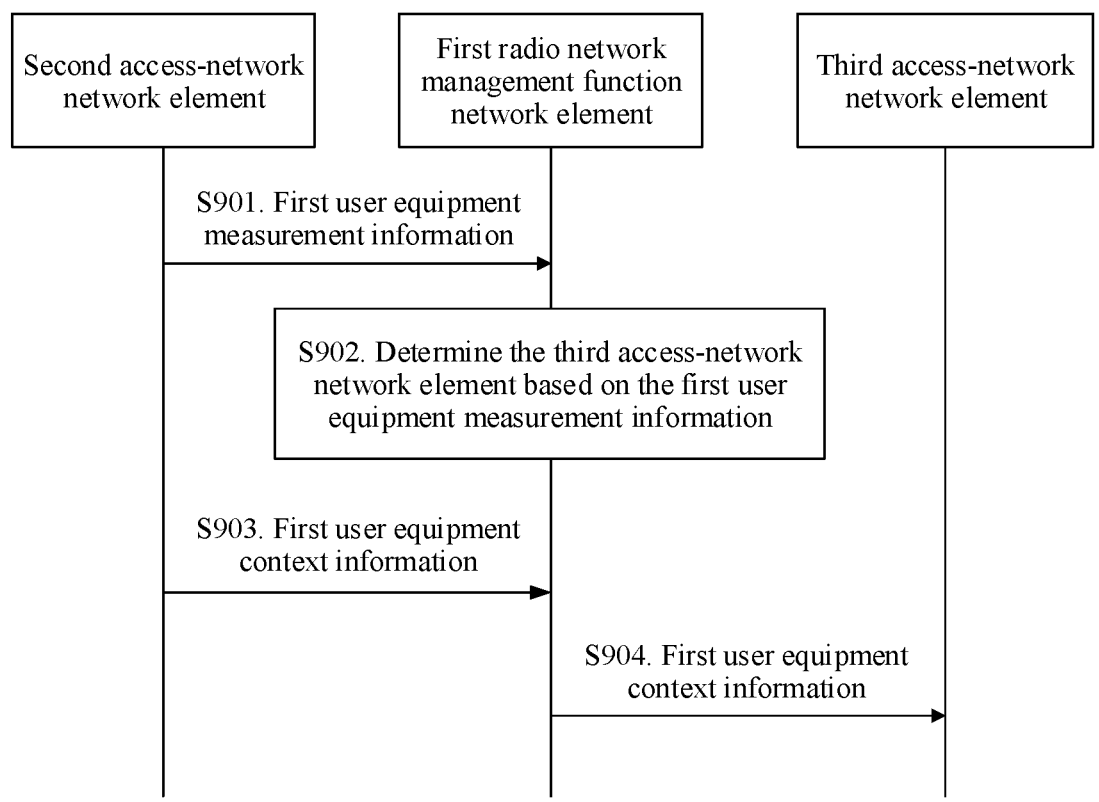
FIG. 9 is a signaling flowchart of a handover for an access network element according to an embodiment of this application.
Figure 10:
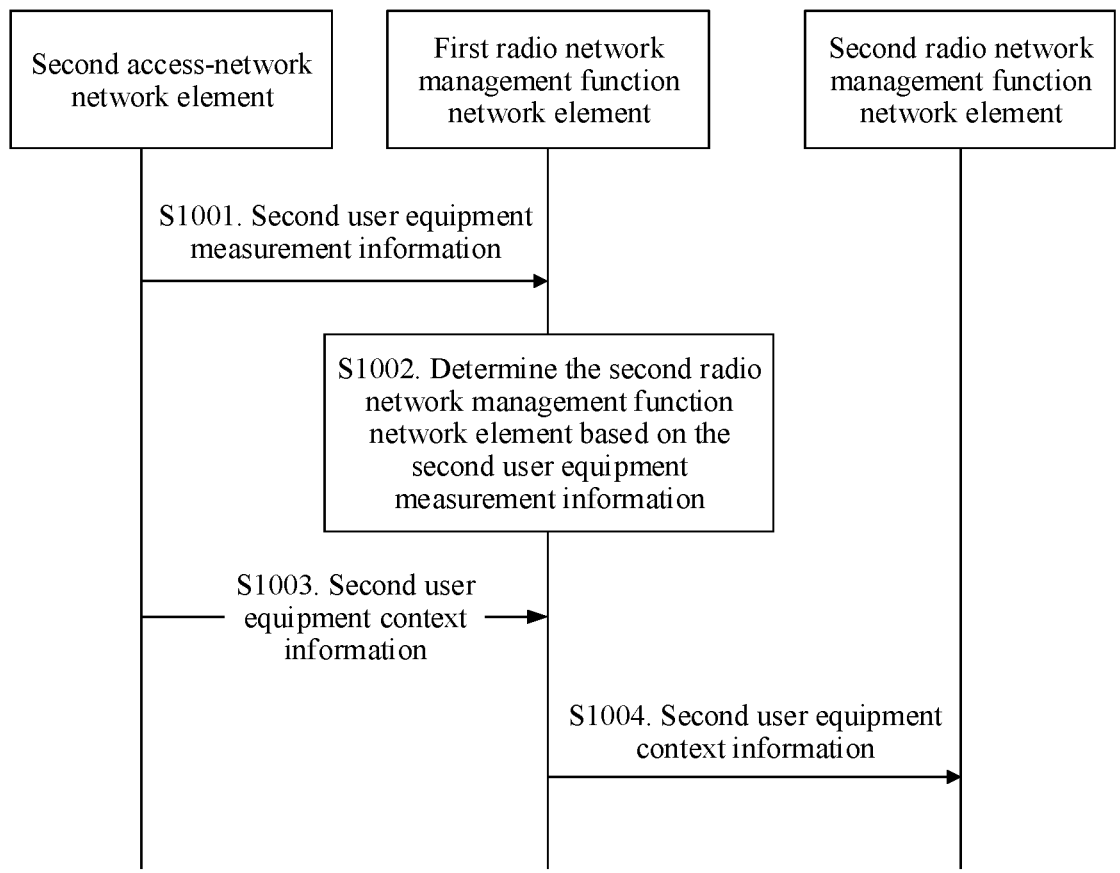
FIG. 10 is a signaling flowchart of a handover for a radio network management function network element according to an embodiment of this application.
Figure 11:
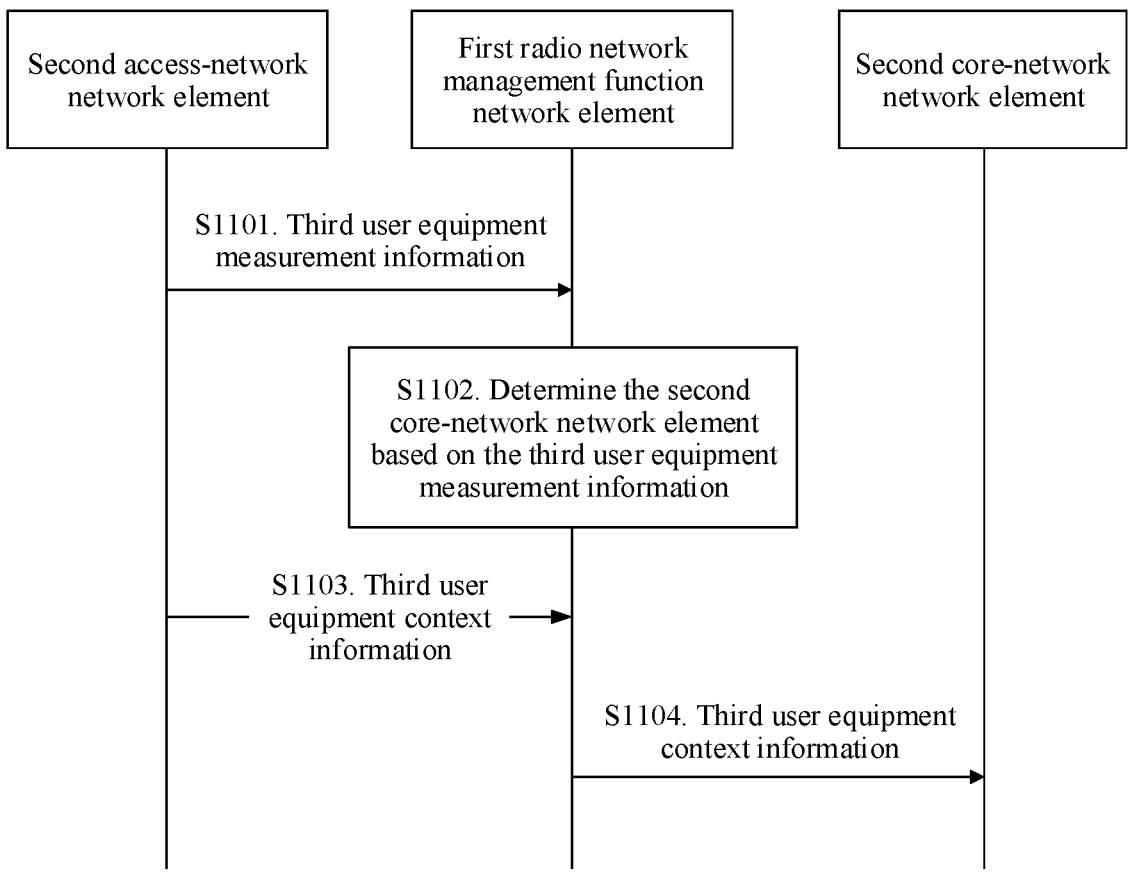
FIG. 11 is a signaling flowchart of a handover for a core network element according to an embodiment of this application.

To clearly describe an embodiment of a handover for a network element in the communication method provided in the embodiments of this application, the following describes three handover scenarios with reference to FIG. 9 to FIG. 11.

In a first network element handover scenario, a type of a target network element for which a handover needs to be performed is an access network element. FIG. 9 is a signaling flowchart of the scenario. An embodiment of the scenario may include the following operations.

S901. A first radio network management function network element receives first user equipment measurement information from a second access network element, where the second access network element serves user equipment.

S902. The first radio network management function network element determines a third access network element based on the first user equipment measurement information.

S903. The first radio network management function network element receives first user equipment context information from the second access network element.

S904. The first radio network management function network element sends the first user equipment context information to the third access network element.

It can be understood that the second access network element is a source access network element that serves the user equipment before a handover, and the third access network element is a target network element to which the user equipment is to be handed over and that serves the user equipment. In an embodiment, the third access network element may be determined by the first radio network management function network element based on the received first user equipment measurement information.

For example, in the communications architecture shown in FIG. 7, it is assumed that the second access network element in a current wireless network is the RRC 7021, the first radio network management function network element is the RNMF 712, and a first core network element is the NRF 7221. A handover process may include: The RRC 7021 sends first user equipment measurement information to the RNMF 712. The RNMF 712 determines, based on the first user equipment measurement information, that a target network element is the RRC 7011. In this case, the RRC 7021 sends first user equipment context information to the RNMF 712. Then the RNMF 712 sends the first user equipment context information to the RRC 7011, to complete the handover.

It should be noted that, for descriptions of a complete communication process in the scenario, refer to an example 6 below.

In a second network element handover scenario, a type of a target network element for which a handover needs to be performed is a first radio network management function network element that can provide a service-based interface. FIG. 10 is a signaling flowchart of the scenario. An embodiment of the scenario may include the following operations.

S1001. A first radio network management function network element receives second user equipment measurement information from a second access network element, where the second access network element serves user equipment.

S1002. The first radio network management function network element determines a second radio network management function network element based on the second user equipment measurement information.

S1003. The first radio network management function network element receives second user equipment context information from the second access network element.

S1004. The first radio network management function network element sends the second user equipment context information to the second radio network management function network element.

It can be understood that the first radio network management function network element is a source radio network management function network element that serves the user equipment before a handover, and the second radio network management function network element is a target network element to which the user equipment is to be handed over and that serves the user equipment. In an embodiment, the second radio network management function network element may be determined by the first radio network management function network element based on the received second user equipment measurement information.

In an example, if the first radio network management function network element stores configuration information about another radio network management function network element, that is, the configuration information may include a correspondence between each radio network management function network element that provides a service-based interface and a serving cell corresponding to the radio network management function network element, S1002 may include: The first radio network management function network element determines the second radio network management function network element based on the second user equipment measurement information by using the configuration information in the first radio network management function network element. In an embodiment, the first radio network management function network element may determine, based on the second user equipment measurement information, a cell in which the user equipment is currently located, where the cell is denoted as a target cell (target ID). The first radio network management function network element queries the configuration information stored in the first radio network management function network element for a network element that provides a service-based interface and that serves the target cell, and uses the network element as the second radio network management function network element.

In another example, if the first radio network management function network element does not store the configuration information, S1002 may further include: The first radio network management function network element determines the second radio network management function network element based on the second user equipment measurement information by querying an NRF network element. In an embodiment, the first radio network management function network element may initiate a query request to the NRF network element, and perform querying by using the target ID, a RAT type (a current access standard of the user equipment), and PLMN information. The NRF network element selects a matching second radio network management function network element based on the information in the query request, and returns a routing address (for example, an IP address) of the second radio network management function network element to the first radio network management function network element.

For example, in the communications architecture shown in FIG. 7, it is assumed that the second access network element in a current wireless network is the RRC 7021, the first radio network management function network element is the RNMF 712, and a first core network element is the NRF 7221. A handover process may include: The RRC 7021 sends second user equipment measurement information to the RNMF 712. The RNMF 712 determines, based on the second user equipment measurement information, that a target network element is the RNMF 711. In this case, the RRC 7021 sends second user equipment context information to the RNMF 712. Then the RNMF 712 sends the second user equipment context information to the RNMF 711, to complete the handover.

In a third network element handover scenario, a target network element for which a handover needs to be performed is a core network element. FIG. 11 is a signaling flowchart of the scenario. An embodiment of the scenario may include the following operations.

S1101. A first radio network management function network element receives third user equipment measurement information from a second access network element, where the second access network element serves user equipment.

S1102. The first radio network management function network element determines a second core network element based on the third user equipment measurement information.

S1103. The first radio network management function network element receives third user equipment context information from the second access network element.

S1104. The first radio network management function network element sends the third user equipment context information to the second core network element.

It can be understood that a first core network element is a source core network element that serves the user equipment before a handover, and the second core network element is a target network element to which the user equipment is to be handed over and that serves the user equipment. In an embodiment, the second core network element may be determined by the first radio network management function network element based on the received third user equipment measurement information.

In an example, if the first radio network management function network element stores configuration information about a core network element, that is, the configuration information may include a correspondence between each core network element and a serving cell corresponding to the core network element, S1102 may include: The first radio network management function network element determines the second core network element based on the third user equipment measurement information by using the configuration information in the first radio network management function network element. In an embodiment, the first radio network management function network element may determine, based on the third user equipment measurement information, a cell in which the user equipment is currently located, where the cell is denoted as a target cell. The first radio network management function network element queries the configuration information stored in the first radio network management function network element for a target core network element that serves the target cell, and uses the target core network element as the second core network element.

In another example, if the first radio network management function network element does not store the configuration information, S1102 may further include: The first radio network management function network element determines the second core network element based on the third user equipment measurement information by querying an NRF network element. In an embodiment, the first radio network management function network element may initiate a query request to the NRF network element, and perform querying by using the target ID, a RAT type (a current access standard of the user equipment), and PLMN information. The NRF network element selects a matching second core network element based on the information in the query request, and returns a routing address (for example, an IP address) of the second core network element to the first radio network management function network element.

For example, in the communications architecture shown in FIG. 7, it is assumed that the second access network element in a current wireless network is the RRC 7021, the first radio network management function network element is the RNMF 712, and the first core network element is the NRF 7221. A handover process may include: The RRC 7021 sends third user equipment measurement information to the RNMF 712. The RNMF 712 determines, based on the third user equipment measurement information, that a target network element is the NRF 7211. In this case, the RRC 7021 sends third user equipment context information to the RNMF 712. Then the RNMF 712 sends the third user equipment context information to the NRF 7211, to complete the handover.

It should be noted that, for related descriptions of the first user equipment measurement information, the first user equipment context information, the second user equipment measurement information, the second user equipment context information, the third user equipment measurement information, the third user equipment context information, and the like, refer to the related interpretations of the user equipment measurement information and the user equipment context information in FIG. 8. Details are not described herein again. After receiving the user equipment context information sent by the first radio network management function network element, the target network element (including the third access network element, the second radio network management function network element, or the second core network element) may also perform an operation similar to that described in FIG. 8, to hand over the user equipment from the source network element (including the second access network element, the first radio network management function network element, or the first core network element) to the target network element.

It should be noted that FIG. 9 to FIG. 11 respectively correspond to a handover for an access network element, a handover for a radio network management function network element, and a handover for a core network element. In this case, in some possible scenarios, there may be more than one network element for which a handover needs to be performed. In this case, a corresponding handover operation may be performed according to the operations in the embodiments corresponding to the three figures. Details are not described herein again. For descriptions of a complete communication process in a scenario in which handovers are performed for the second access network element and the first radio network management function network element, refer to an example 7 below. For descriptions of a complete communication process in a scenario in which handovers are performed for the first access network element, the first radio network management function network element, and the first core network element, refer to an example 8 below.

It can be learned that, in an embodiment of the application, the first radio network management function network element that can provide a service-based interface is introduced between an access network element and a core network element, so that service invocation between the first radio network management function network element and the access network element may be implemented by invoking the second service-based interface of the first radio network management function network element, and service invocation between the first radio network management function network element and the core network element may be implemented by invoking the first service-based interface of the first radio network management function network element. In this way, wireless network communication between the access network element and the core network element can be simply and conveniently implemented, so as to overcome problems such as low efficiency and a relatively long delay of information transmission due to relatively complex and redundant protocol processing when information is transmitted between the access network element and the core network element through protocol processing, and provide a wireless network communication method with relatively high information transmission efficiency and a relatively short transmission delay.

It should be noted that, the "first" in the "first access network element", the "first core network element", and the like are merely used as name identifiers to distinguish between different "network elements", but do not indicate a sequence. Similarly, the "second access network element", the "third access network element", and the like are merely used to identify network elements, and may be a same object or different objects based on limitations of different scenarios.

It should be noted that the wireless network communication method provided in an embodiment of the application may be used in various wireless network communication scenarios. In addition to the scenario in which an access network element registers with a radio network management function network element, the scenario in which a radio network management function network element registers with a core network element, and the scenario in which a handover is performed for each type of network element, the method may be further used in, for example, a paging scenario, a scenario in which UE registers with a wireless network, and a scenario in which UE establishes a PDU session in a wireless network. For descriptions of a complete communication process in the paging scenario, refer to an example 1 and an example 2 below; for descriptions of a complete communication process in the scenario in which UE registers with a wireless network, refer to an example 3 below; for descriptions of a complete communication process in the scenario in which UE establishes a PDU session in a wireless network, refer to an example 4 and an example 5 below.

After the content of an embodiment of the application is described, to make the method provided in an embodiment of the application clearer, the following describes eight examples of scenarios in the embodiments of this application with reference to the accompanying drawings and by using the system architectures shown in FIG. 3 and FIG. 7 as examples.

Example 1: A Scenario of Paging UE in an Idle State

Figure 12:
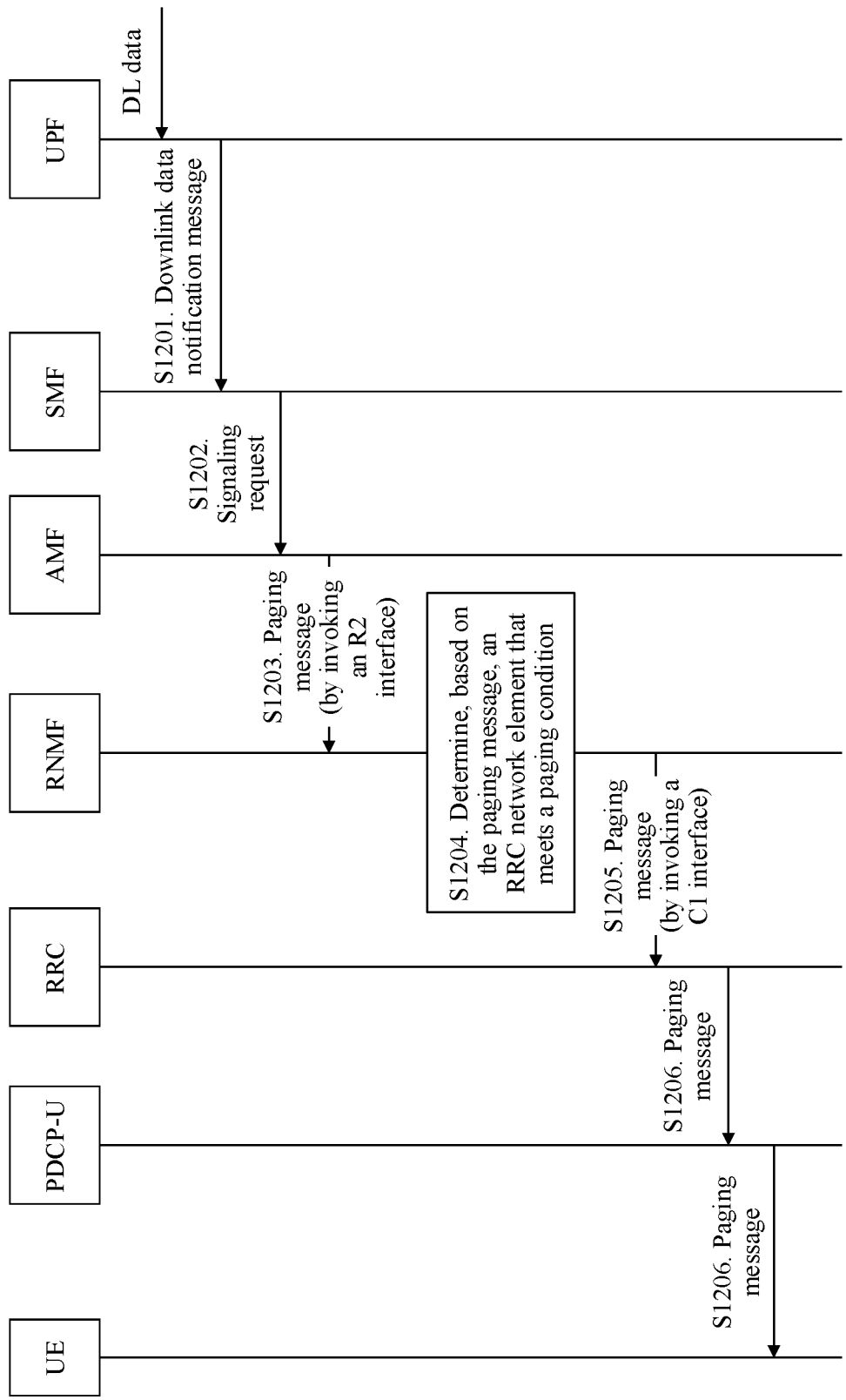
FIG. 12 is a signaling flowchart of an example 1 of a communication method in a wireless network according to an embodiment of this application.

When paged UE is in an idle state, that is, the UE is disconnected from a RAN, and the RAN is disconnected from a core network, paging may be performed with reference to a communication method in a wireless network shown in FIG. 12. For example, a network element that provides a service-based interface is an RNMF network element, an access network element is an RRC network element, and a core network element is an AMF network element. A paging process in the scenario may include the following operations.

S1201. When a user plane function (UPF) receives downlink user data (DL data) that needs to be sent to UE in an idle state, the UPF sends a downlink data notification message to an SMF network element.

S1202. After receiving the downlink data notification message sent by the UPF, the SMF network element sends a signaling request to an AMF network element that needs to be invoked.

S1203. When the AMF network element receives the signaling request about the UE in the idle state from the SMF network element, the AMF may invoke an R2 interface to send a paging message to an RNMF network element.

S1204. The RNMF network element determines, based on information such as a registration area list (Registration area list) or service information (for example, a service type) carried in the paging message sent by the AMF network element, an RRC network element that meets a paging condition.

S1205. The RNMF network element invokes a C1 interface to send a paging message to the determined RRC network element.

S1206. After receiving the paging message, the RRC network element may send the paging message to a corresponding PDCP-U network element, so that the PDCP-U network element may page the corresponding UE in the idle state based on the paging message.

It can be learned that, in the communication method used in an embodiment, the RNMF network element that includes the R1 interface and the C1 interface is introduced, so that wireless network communication between an access network element and a core network element can be simply and conveniently implemented, so as to problems such as low efficiency and a relatively long delay of information transmission due to relatively complex and redundant protocol processing when information is transmitted between the access network element and the core network element through protocol processing, and provide a wireless network communication method with relatively high information transmission efficiency and a relatively short transmission delay.

Example 2: A Scenario of Paging UE in an Inactive State

Figure 13:
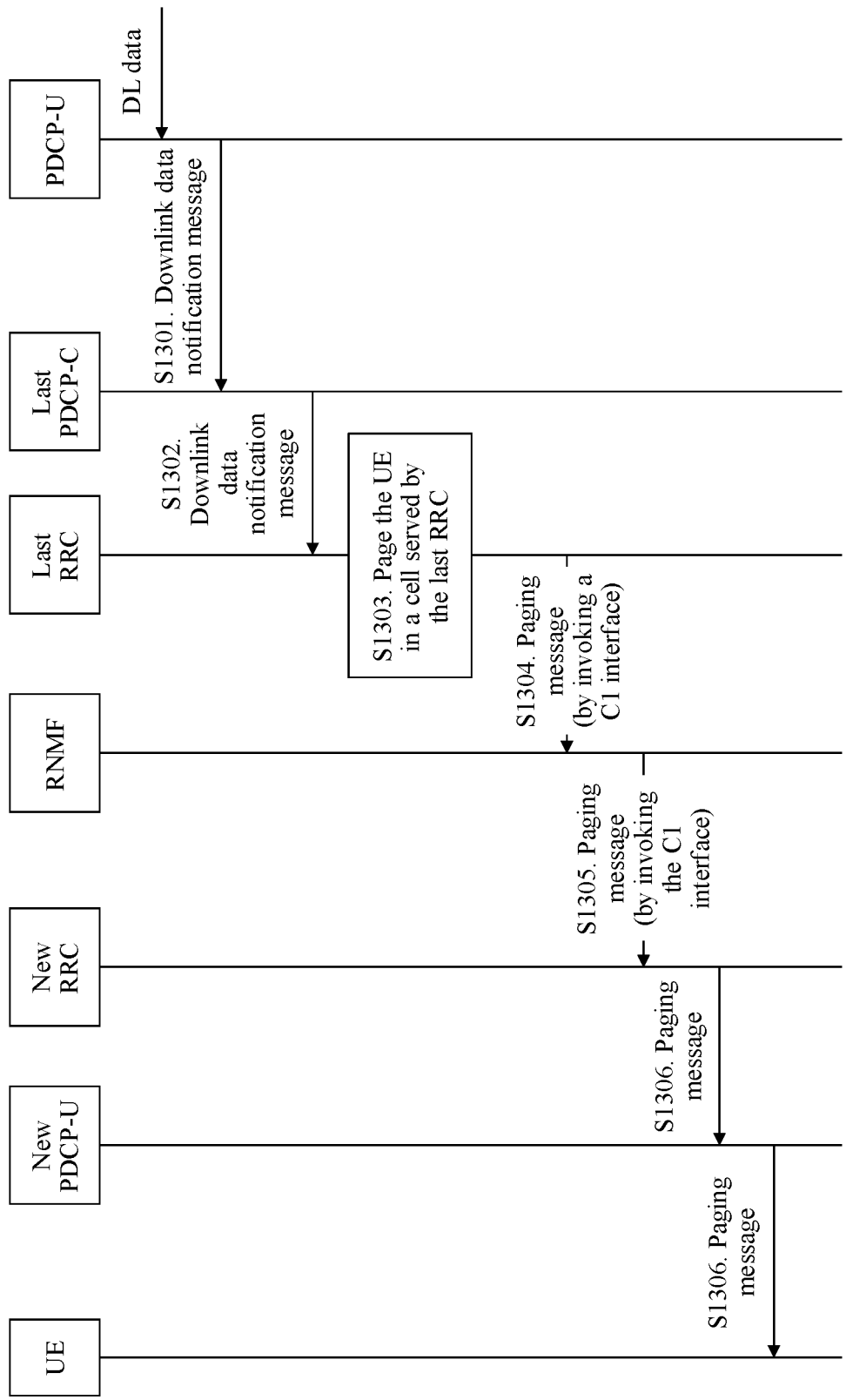
FIG. 13 is a signaling flowchart of an example 2 of a communication method in a wireless network according to an embodiment of this application.

When paged UE is in an inactive state, that is, the UE is disconnected from a RAN, and the RAN is connected to a core network, FIG. 13 shows a signaling procedure of paging the UE in the inactive state. When DL data is sent to a PDCP-U network element, because the PDCP-U network element is disconnected from called UE, the PDCP-U network element cannot communicate with the called UE. In this case, paging is performed according to a communication method in a wireless network. For example, a network element that provides a service-based interface is an RNMF network element, and access network elements are a last RRC network element and a new RRC network element. A paging process in the scenario may include the following operations.

S1301. When receiving DL data that needs to be sent to UE in an inactive state, a PDCP-U network element sends a downlink data notification message to a PDCP-C network element in a last RAN (denoted as last PDCP-C in the figure).

It can be understood that the downlink data notification message carries an IP address or an identifier of packet-related UE and a QoS flow identifier (QFI). For example, the IP address or the identifier of the UE may be used to identify UE that needs to be paged, and the QFI is used to identify QoS information.

S1302. The last PDCP-C network element sends the received downlink data notification message to a last RRC network element.

S1303. The last RRC network element pages the UE in a cell served by the last RRC network element. For a paging procedure, refer to the descriptions in S1006 shown in FIG. 10.

S1304. In addition to paging the UE in the cell served by the last RRC network element, the last RRC network element may further trigger paging to the UE in a cell identified by an RNA, and invoke a C1 interface to send, to an RNMF network element, a paging message that carries information such as an RNA identifier, a paging identifier of the UE, and a paging neighborhood area.

S1305. The RNMF network element may determine a corresponding new RRC network element based on the RNA identifier in the paging message, and invoke the C1 interface to send a paging message to the determined new RRC network element.

S1306. After the new RRC network element receives the paging message, for a paging procedure, refer to the descriptions in S1206 shown in FIG. 12.

It can be learned that, in the communication method used in an embodiment, the RNMF network element that includes the C1 interface is introduced, so that wireless network communication between access network elements can be simply and conveniently implemented, particularly, the UE in the inactive state can be simply and efficiently paged, so as to overcome problems such as low efficiency and a relatively long delay of information transmission due to relatively complex and redundant protocol processing when information is transmitted between access network elements through protocol processing, and provide a wireless network communication method with relatively high information transmission efficiency and a relatively short transmission delay.

Example 3: A Scenario in which UE Registers with a Wireless Network

Figure 14A:
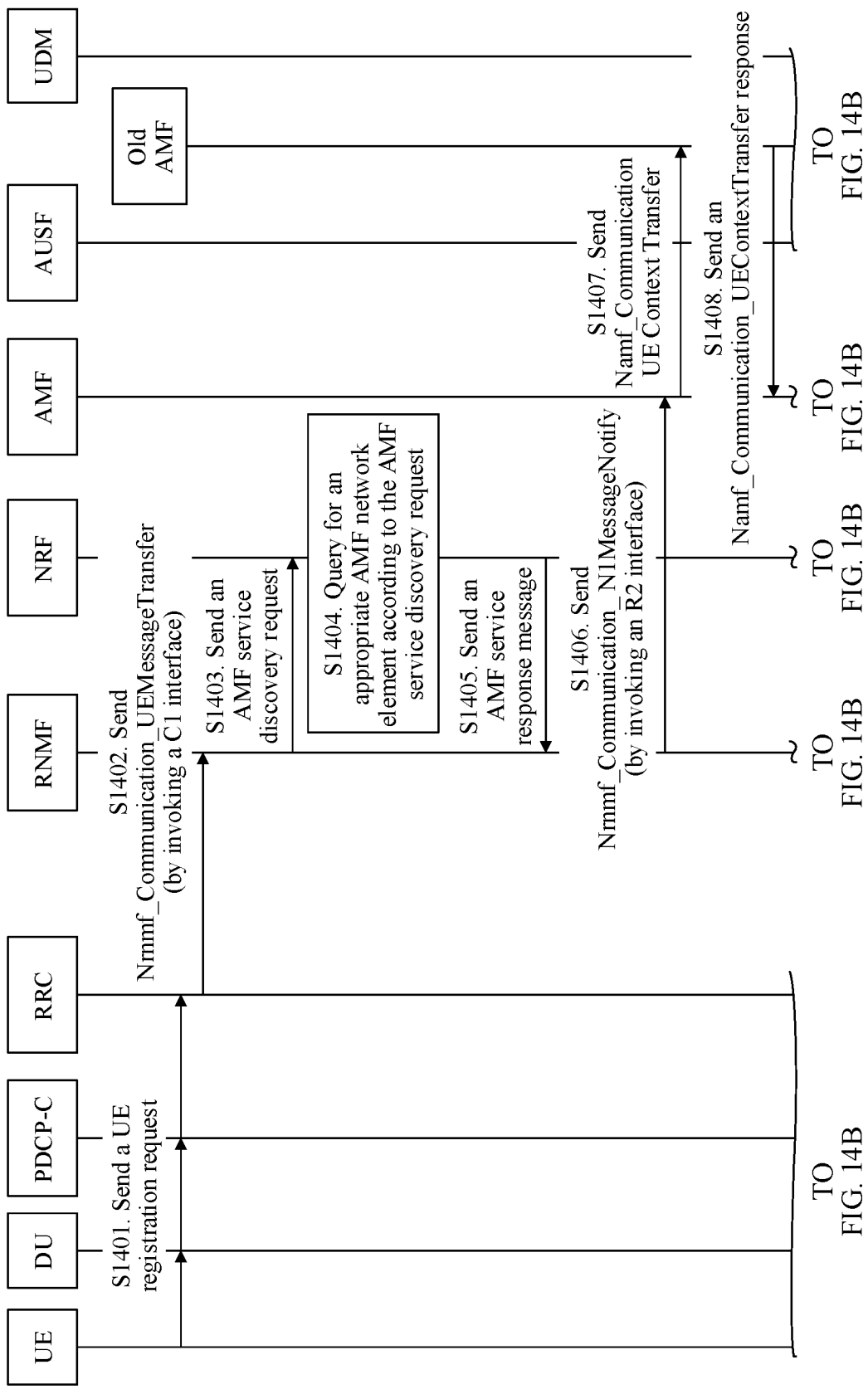
FIG. 14A and FIG. 14B are a signaling flowchart of an example 3 of a communication method in a wireless network according to an embodiment of this application.
Figure 14B:
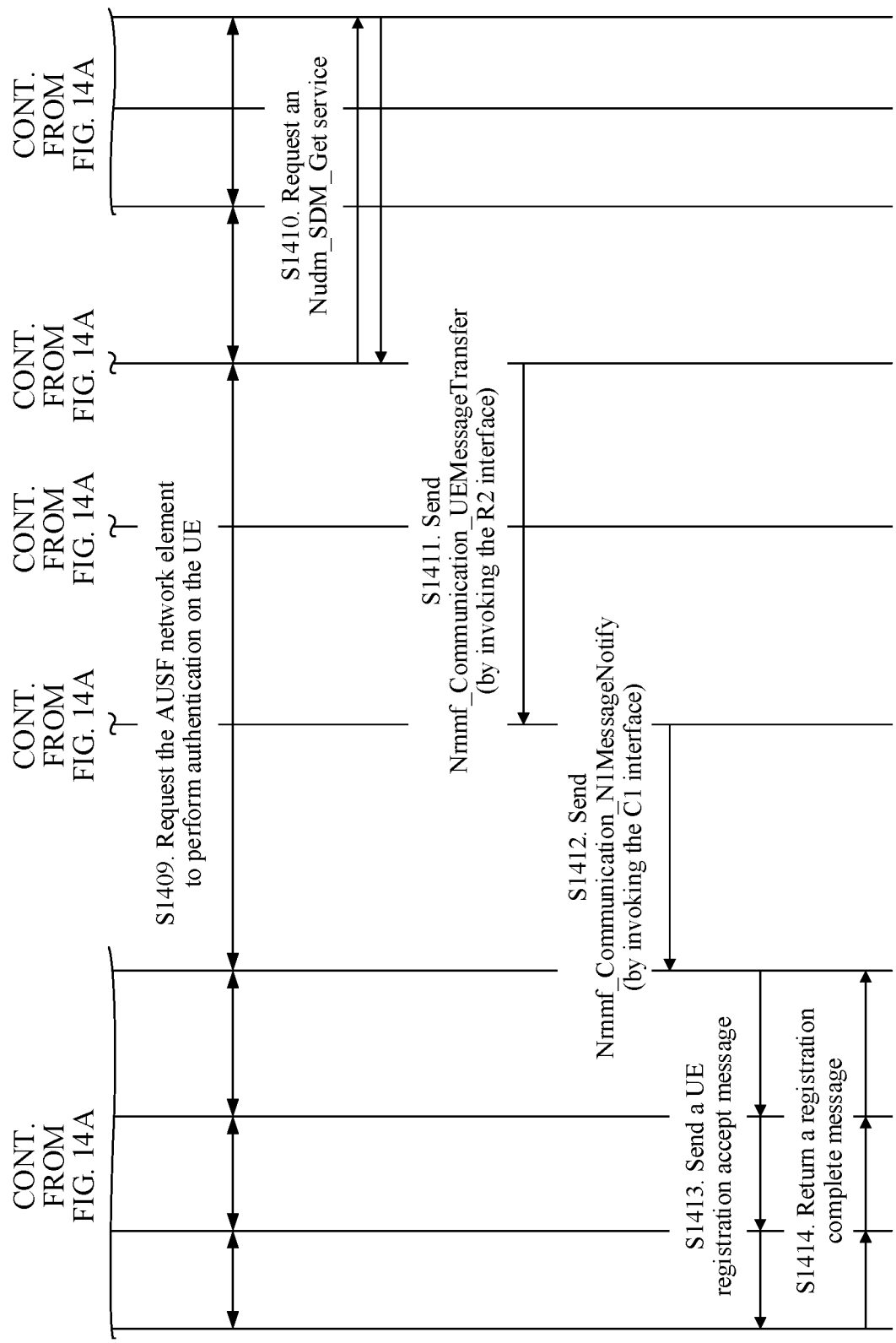

Before performing communication by using a wireless network to which the UE has been connected, UE needs to register with the wireless network. Registration of the UE may be implemented with reference to a communication method in a wireless network shown in FIG. 14A and FIG. 14B. For example, a network element that provides a service-based interface is an RNMF network element, an access network element is an RRC network element, and a core network element is an AMF network element. The scenario may include the following operations.

S1401. UE may send a UE registration request to an RRC network element by using a distributed unit (DU) and a PDCP-C network element.

The UE registration request may carry an SUCI (or an old 5G-GUTI), a PLMN ID, and a registration request PDU. For example, the registration request PDU is information content sent by the UE to a core network. A RAN does not process the UE registration request.

S1402. After receiving the UE registration request, the RRC network element invokes a C1 interface to send Nmmf_Communication_UEMessageTransfer to an RNMF network element with which the RRC network element registers.

The message is also a UE registration request. The message carries information such as the PLMN ID, the old 5G-GUTI, a cell identifier (cell ID), and a RAT type. If the UE provides an equivalent PLMM list, the equivalent PLMM list may also be carried in the UE registration request.

S1403. The RNMF network element initiates an AMF service discovery request to an NRF network element, to query for related information of a service of an AMF network element. The AMF service discovery request carries at least one of the following information: the PLMN ID, the current cell identifier (cell ID), the RAT type, the old 5G-GUTI, and the like, to provide reference for the NRF network element to query for the AMF network element.

S1404. The NRF network element queries for an appropriate AMF network element according to the AMF service discovery request.

S1405. The NRF network element generates an AMF service response message, and sends the AMF service response message to the RNMF network element. In this case, the RNMF network element may create a UE context of the UE in the RNMF network element, and record the PLMN ID, the cell ID, the RAT type, the old 5G-GUTI, an RRC ID, and an IP address of the AMF network element to the UE context.

S1406. The RNMF network element invokes an R2 interface to send Nmmf_Communication_N1MessageNotify to the AMF network element.

The message is a UE registration request, and may carry at least one of the following information: a UE registration PDU, the PLMN ID, the cell ID, the RAT type, an RNMF ID, and the like.

S1407. The AMF network element sends Namf_Communication UE Context Transfer to an old AMF network element.

In an embodiment, the AMF network element may obtain related information by parsing the UE registration PDU in the received Nmmf_Communication_N1MessageNotify. If the related information carries the old 5G-GUTI, the AMF network element sends a query request to the NRF network element to obtain address information of the old AMF network element. The NRF network element queries, based on the old 5G GUTI in the query request, whether an available AMF network element exists. If an available AMF network element exists, the NRF network element sends an IP address of the old AMF network element to the AMF network element.

S1408. If the old AMF stores a UE context, the old AMF network element sends an Namf_Communication_UEContextTransfer response to the AMF network element.

The Namf_Communication_UEContextTransfer response may carry a UE-related context of the UE.

S1409. The AMF network element requests an AUSF network element to perform authentication on the UE, and sends the UE-related context to the AMF network element. In this case, the AMF immediately initiates an AS security procedure and a NAS security procedure to activate an AS/NAS security mechanism. If the AUSF fails to authenticate the UE, S1411 is performed.

S1410. The AMF network element requests access and mobility-related subscription data of the UE by using an Nudm_SDM_Get service provided by a user data management (UDM).

S1411. After completing UE registration-related processing, the AMF network element invokes the R2 interface to send Nmmf_Communication_UEMessageTransfer to the RNMF network element.

The message is a UE registration accept message. The message may carry information such as a registration accept PDU, a 5G-GUTI, a handover restriction list, a UE-AMBR, and an AMF ID. For example, the 5G-GUTI is a new identifier allocated by the AMF network element to the UE, and the AMF ID is used to identify the AMF, and may be a GUAMI or another ID (identifier) that uniquely identifies the AMF.

In an embodiment, the AMF network element may send information about a location area served by the AMF network element (for example, a served cell or PLMN) to the RNMF network element. The RNMF network element stores, in status information of the AMF network element, the information about the location area served by the AMF network element.

When the authentication performed by the AUSF fails in S1409, the AMF network element may reject the UE registration request, and return a registration reject PDU in S1409, where a rejection cause (cause) (for example, the authentication fails) is carried in the registration reject PDU. In this case, the AMF network element may add the registration reject PDU, the cause (for example, the authentication fails and the registration is rejected), and the AMF ID to the message in S1411. For example, after receiving the cause information, the RNMF network element deletes the UE-related context, and sends the registration reject PDU to the UE in operation S1412 or S1413.

S1412. After receiving the UE registration accept message, the RNMF network element may parse the UE registration accept message and record parsed-out information to a context of the UE. For example, a newly allocated 5G-TURI, the handover restriction list, the UE-AMBR, the AMF ID, the information about the location area served by the AMF network element, and the like may be included and stored in the context of the UE. In addition, the RNMF network element sends Nmmf_Communication_N1MessageNotify to the RRC network element through the C1 interface.

In an embodiment, the 5G-GUTI and the UE-AMBR that are sent in S1411 may also be sent to the RRC network element.

When receiving a registration request reject message from the AMF, the RNMF network element deletes related information of the UE, and sends a UE registration accept message to the RRC network element by using the Nmmf_Communication_N1MessageNotify service.

S1413. The RRC network element sends a UE registration accept message to the UE by using the PDCP-C network element and the DU network element.

S1414. After receiving the UE registration accept message, the UE returns a registration complete message to the RRC network element by using the DU network element or the PDCP-C network element.

It can be learned that, in the communication method used in an embodiment, the RNMF network element that includes the C1 interface and the R2 interface is introduced, so that the UE can simply and efficiently register with a network to which the UE has been connected, so as to overcome problems such as low efficiency and a relatively long delay of information transmission due to relatively complex and redundant protocol processing when information is transmitted between an access network element and a core network element through protocol processing, and provide a wireless network communication method with relatively high information transmission efficiency and a relatively short transmission delay.

Figure 15A:
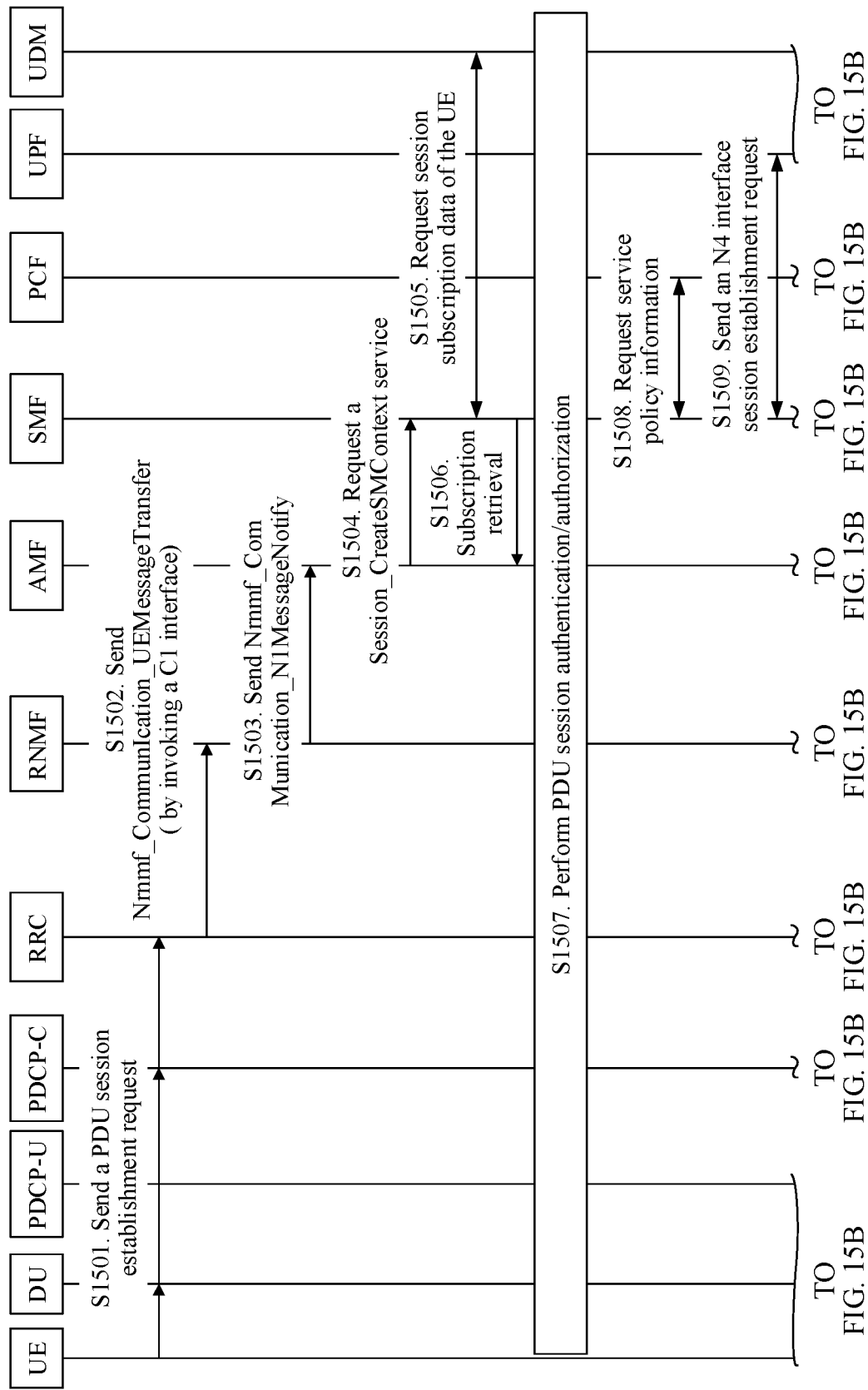
FIG. 15A to FIG. 15C are a signaling flowchart of an example 4 of a communication method in a wireless network according to an embodiment of this application.
Figure 15B:
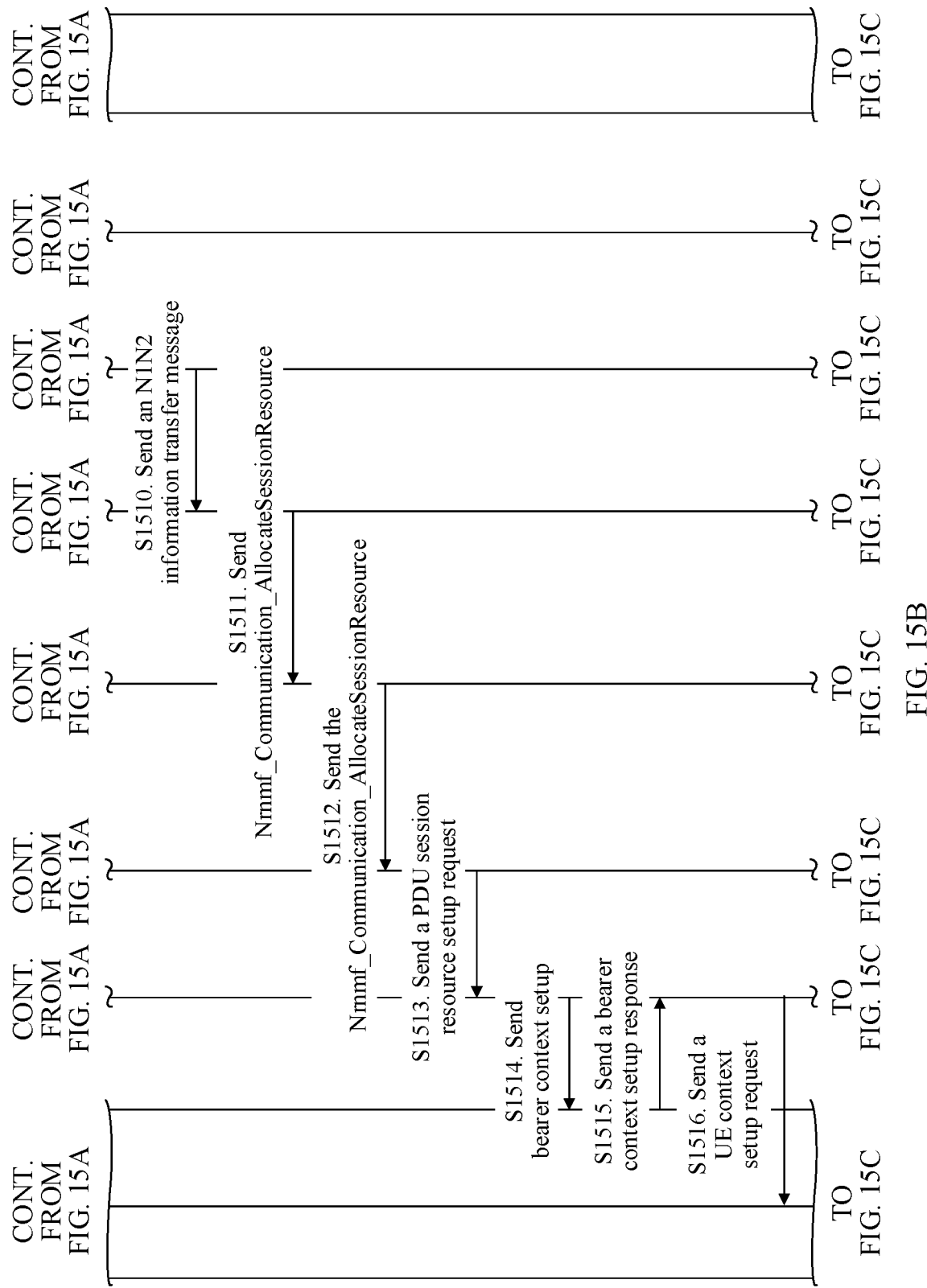
Figure 15C:
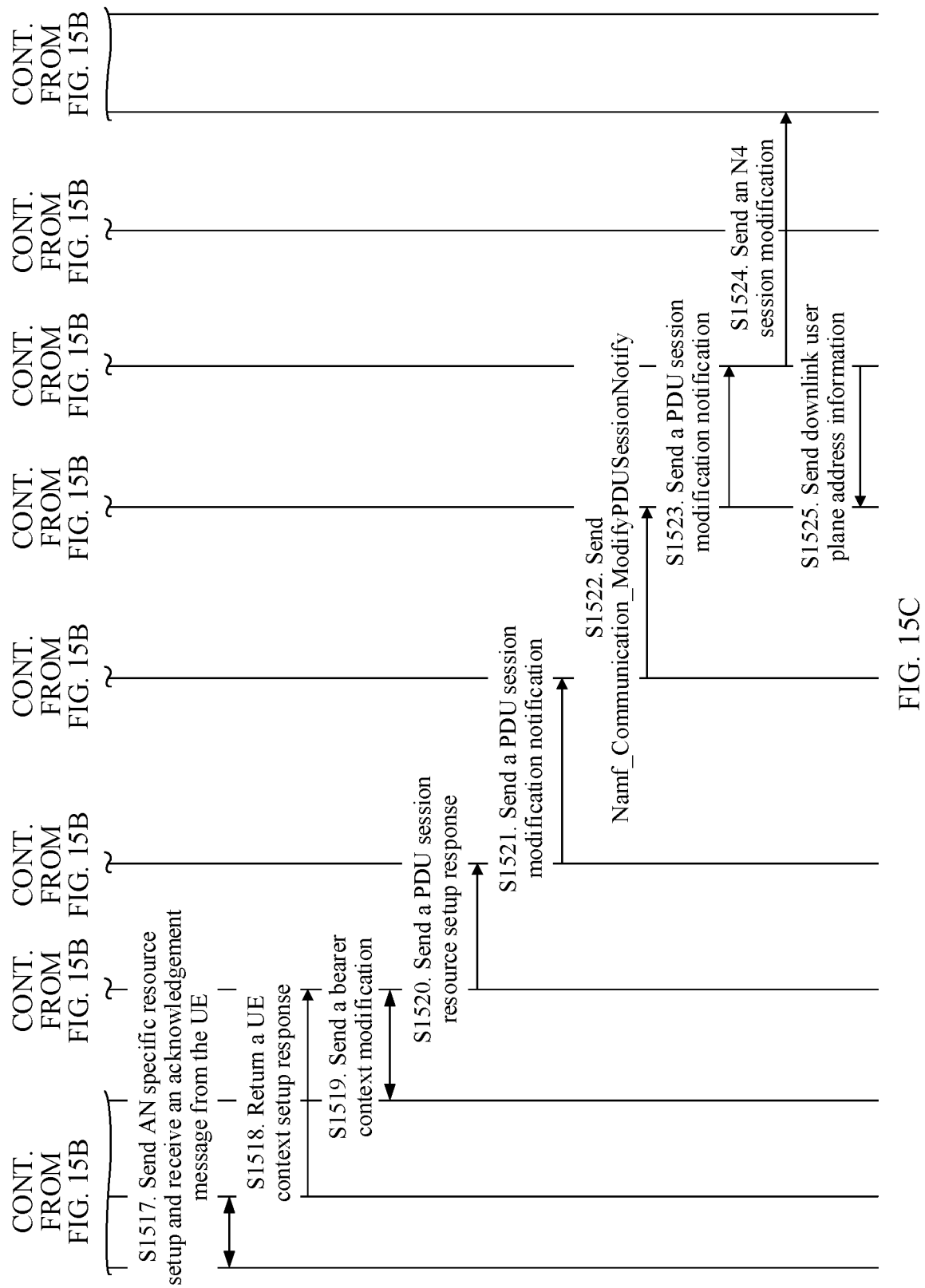

Example 4: A Scenario (1) in which UE Establishes a PDU Session in a Wireless Network Before performing communication by using a wireless network to which the UE has been connected, UE needs to establish one or more communication paths in the wireless network, that is, establish a PDU session, to ensure normal and orderly communication. A process of establishing a PDU session is implemented with reference to a communication method in a wireless network shown in FIG. 15A to FIG. 15C. For example, a network element that provides a service-based interface is an RNMF network element, an access network element is an RRC network element, and a core network element is an AMF network element. The scenario may include the following operations.

S1501. UE may send a PDU session establishment request to an RRC network element by using a DU network element and a PDCP-C network element.

S1502. After receiving the PDU session establishment request, the RRC network element invokes a C1 interface to send Nmmf_Communication_UEMessageTransfer to an RNMF network element with which the RRC network element registers.

The message is also a PDU session establishment request. The message carries information such as a NAS PDU (which may include PDU session establishment) and a 5G-GUTI.

S1503. The RNMF network element invokes an R2 interface to send Nmmf_Communication_N1 Message Notify to an AMF network element.

S1504. After receiving the PDU session establishment request, the AMF network element invokes a PDU Session_CreateSMContext service provided by an SMF network element, to request the SMF network element to create a session management (SM) context for the UE.

S1505. After receiving a PDU session establishment service request from the AMF network element, the SMF network element requests session subscription data of the UE from a UDM network element.

S1506. The SMF network element sends a subscription retrieval to the AMF network element.

S1507. Perform PDU session authentication/authorization.

S1508. The SMF network element requests service policy information from a PCF network element.

S1509. The SMF network element performs a policy decision based on the session subscription data and the policy information, determines a QoS parameter and the like, allocates an IP address to the UE, selects a UPF network element, and sends an N4 interface session establishment request to the selected UPF network element, to complete configuration of the UPF network element.

S1510. After completing service processing, the SMF network element sends an N1N2 information transfer message to the AMF network element, to send session context information to the AMF network element.

S1511. After performing SM service processing in a core network, the AMF network element invokes the R2 interface to send Nmmf_Communication_AllocateSessionResource to the RNMF network element.

The message is a PDU session establishment accept message, and the message is also used to trigger a processing procedure of establishing a PDU session on a RAN side. The message carries a PDU session establishment accept identifier (which may be encapsulated in a NAS PDU), a UE ID, and a PDU session resource setup list.

For example, the PDU session resource setup list is a parameter configuration set for one or more PDU sessions that are requested to be established, and may include an ID of a PDU session and a PDU session resource setup request. The PDU session resource setup request transfer includes information such as a PDU session resource aggregate maximum bit rate, a UL NG-U address, a PDU session type, a security indication (Security indication, used to indicate whether to enable encryption protection and/or integrity protection), a QFI, and QoS flow level QoS parameters.

S1512. The RNMF network element invokes the C1 interface to send the received Nmmf_Communication_AllocateSessionResource to the RRC network element.

It can be understood that the RNMF network element may alternatively store information carried in the Nmmf_Communication_AllocateSessionResource as PDU session context information.

S1513. After receiving the PDU session establishment accept message sent by the RNMF network element, the RRC network element sends a PDU session resource setup (PDU session resource setup) request to the PDCP-C network element.

The message may carry a DRB ID allocated by the RRC network element and other PDU session context information.

S1514. The PDCP-C network element parses the PDU session resource setup list, further parses the PDU session resource setup request transfer to obtain related parameter configuration information of an established PDU session, and sends a bearer context setup message to a determined PDCP-U network element for bearer context setup.

The message carries the DRB ID, the PDU session resource AMBR, the UL NG-U address (for example, a UL GTP TEID and IP address of the UPF), and the security indication (a value may be "required", "preferred", or "not needed").

S1515. The PDCP-U network element allocates a downlink NG-U address (for example, a DL GTP TEID and IP address), and an uplink (UL) PDCP-U TEID and IP address, performs resource configuration based on the parameters in the request message, and returns a bearer context setup response message to the PDCP-C network element for bearer context setup.

The message may carry the DRB ID, the DL NG-U address (for example, the DL GTP TEID and IP address), and a security result (a value of the security result is "performed" or "not performed").

If a plurality of DRBs need to be established, the PDCP-C network element may repeatedly perform S1514 and S1515, and a plurality of different PDCP-U network elements may be selected for different DRBs.

S1516. The PDCP-C network element sends a UE context setup request message to the DU network element, to perform resource configuration for the DU network element.

The message may carry the PDU session establishment accept message, the DRB ID, QoS, and the UL PDCP-U GTP TEID and IP address.

S1517. The DU network element sends an resource setup message to the UE, and receives an acknowledgement message from the UE.

The message may carry the PDU session establishment accept message.

S1518. The DU network element returns a UE context setup response message to the PDCP-C network element.

The message may carry the DRB ID and the DL DU address (for example, the DL GTP TEID and IP address).

S1519. The PDCP-C network element sends a bearer context modification message to the PDCP-U network element, updates the DL DU address (the DL GTP TEID and IP address) in a UE context, and receives an acknowledgement message fed back by the PDCP-U.

The message may carry the DRB ID and the DL DU address (for example, the DL GTP TEID and IP address).

S1520. The PDCP-C network element sends a PDU session resource setup response message to the RRC network element.

The message may carry a PDU session ID and downlink user plane address (DL NG-U address) information (for example, a DL PDCP-U GTP TEID and IP address) corresponding to the PDCP-U network element.

S1521. The RRC network element may invoke the C1 interface to send a PDU session modification notification (Nmmf_Communication_ModifySessionResource) to the RNMF network element, to send the downlink user plane address (DL NG-U address) information (for example, the DL PDCP-U GTP TEID and IP address) of the PDCP-U network element to the RNMF network element.

S1522. The RNMF network element invokes the R2 interface to send the Namf_Communication_ModifyP-DUSessionNotify to the AMF network element.

S1523. The AMF network element performs an internal PDU session update service processing procedure in the core network, that is, sends a PDU session modification notification to the SMF network element, and invokes, for example, a PDU Session_UpdateSMContext service.

S1524. The SMF network element may send an N4 session modification to the UPF network element.

The N4 session modification includes the downlink user plane address (DL NG-U address) information (for example, the DL PDCP-U GTP TEID and IP address).

S1525. After receiving the DL NG-U address information, the SMF network element sends the downlink user plane address information to the UPF network element by using an N4 interface session modification procedure.

It can be learned that, in the communication method used in an embodiment, the RNMF network element that includes the C1 interface and the R2 interface is introduced, so that a PDU session can be simply and efficiently established in a network to which the UE has been connected, so as to overcome problems such as low efficiency and a relatively long delay of information transmission due to relatively complex and redundant protocol processing when information is transmitted between an access network element and a core network element through protocol processing, and provide a wireless network communication method with relatively high information transmission efficiency and a relatively short transmission delay.

Figure 16A:
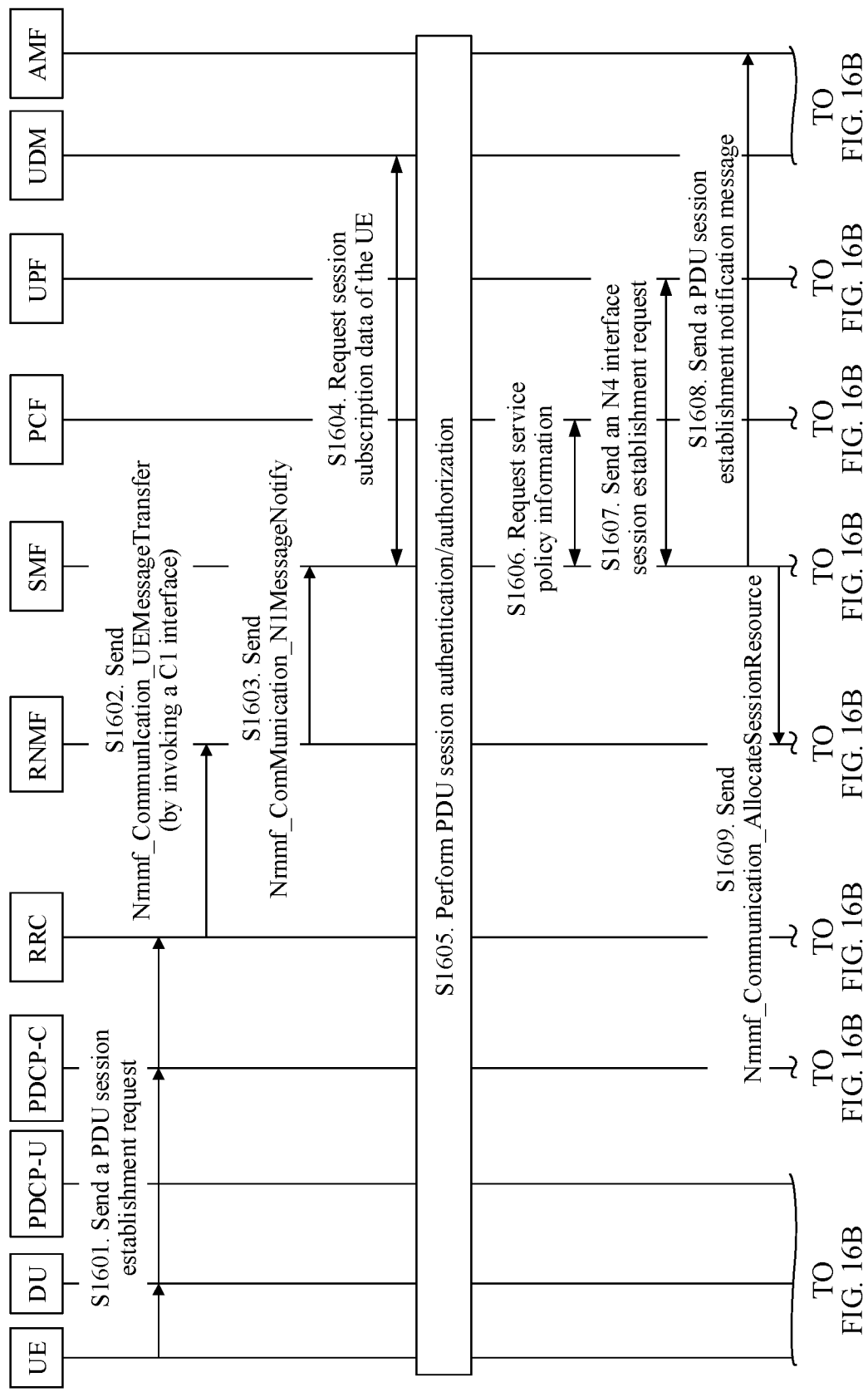
Figure 16B:
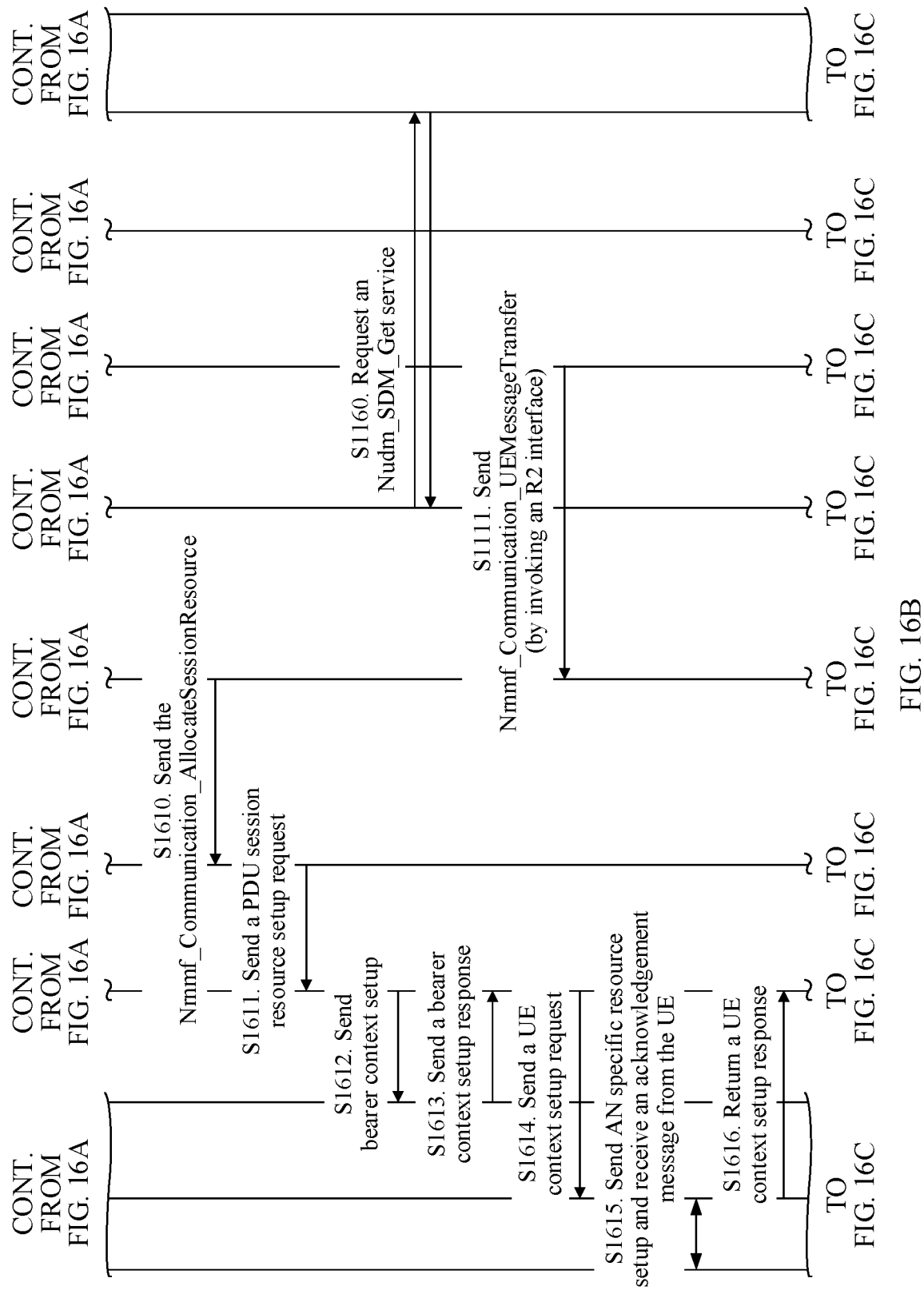

Example 5: A Scenario (2) in which UE Establishes a PDU Session in a Wireless Network A process of establishing a PDU session with reference to a communication method in a wireless network shown in FIG. 16A to FIG. 16C differs from the example 4 as follows: In this example, that an RNMF network element is connected to a service-based bus of a core network through an R2 interface is fully utilized, that is, the RNMF network element may be directly connected to an SMF network element through the R2 interface without forwarding processing by an AMF network element. In an embodiment of this example, refer to FIG. 15A to FIG. 15C. Except that S1504, S1506, S1510, S1523, and S1525 in FIG. 15A to FIG. 15C do not need to be performed, for descriptions of other operations, refer to the related descriptions in the example 4. Details are not described herein again.

Example 6: A Scenario of a Handover for Each Function Network Element in a RAN

Figure 17A:
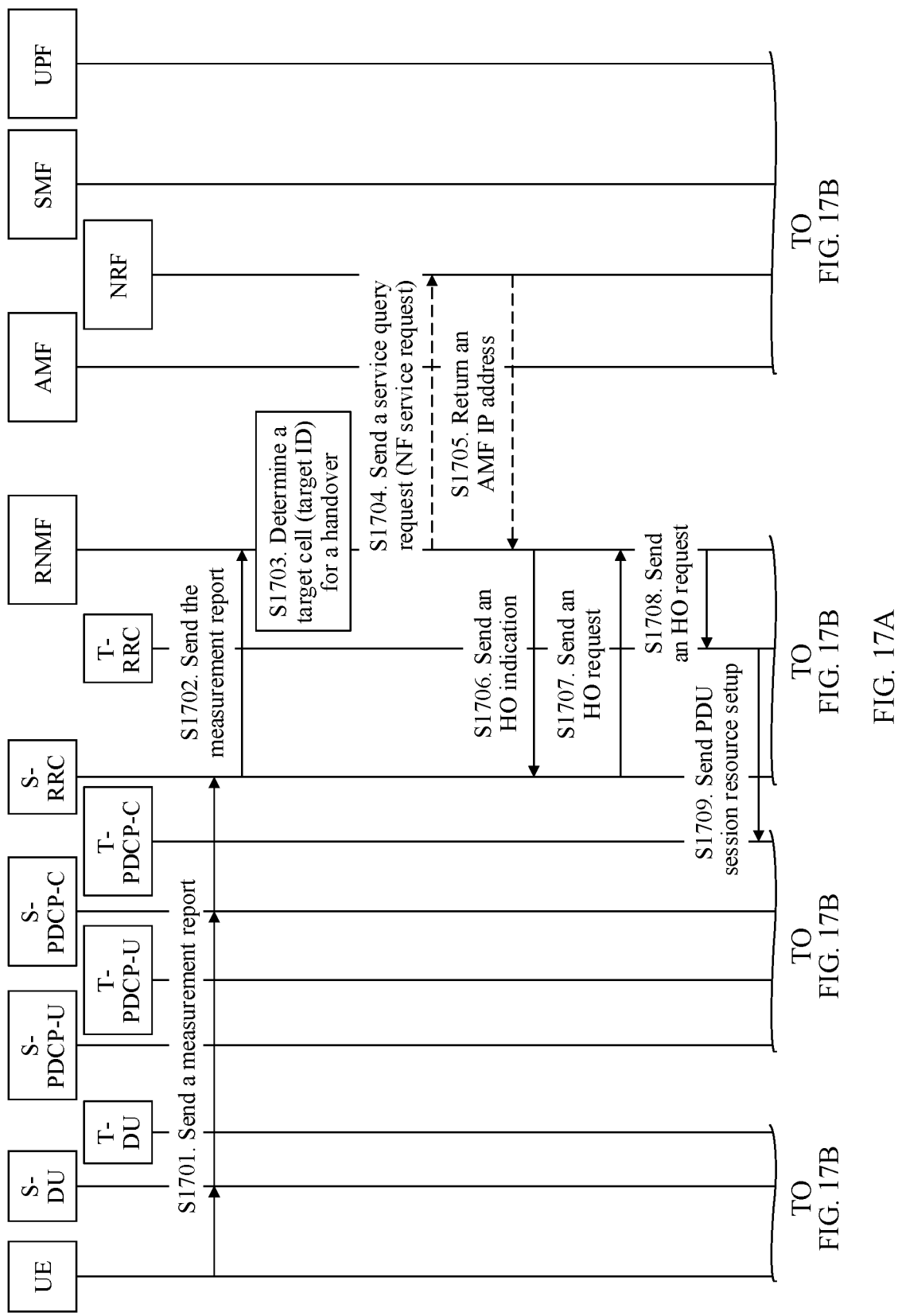
FIG. 17A and FIG. 17B are a signaling flowchart of an example 6 of a communication method in a wireless network according to an embodiment of this application.
Figure 17B:
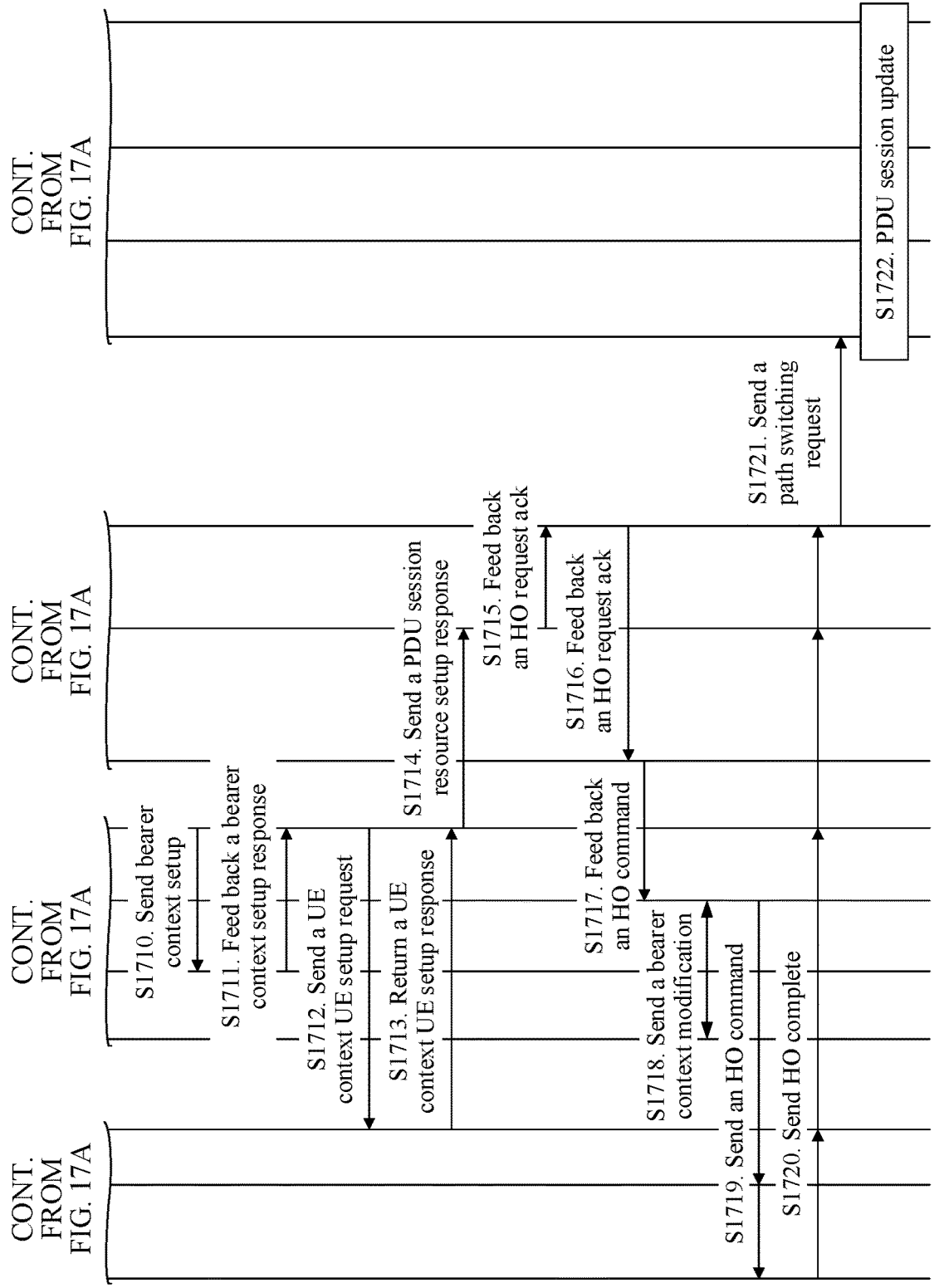

After UE moves, when an RNMF network element determines, based on a target cell (target ID) after the UE moves, that a handover needs to be performed for each network element in a RAN, with reference to a communication method shown in FIG. 17A and FIG. 17B, the RNMF network element may indicate to initiate a handover for each network element in the RAN. For example, a network element that provides a service-based interface is an RNMF network element, a source access network element is an S-RRC network element, and a target access network element is a T-RRC network element. The scenario may include the following operations.

S1701. UE performs signal measurement, and sends a measurement report (Measurement Report) of the UE to an S-RRC network element in a source RAN by using an S-DU network element or an S-PDCP-C network element in the source RAN.

The measurement report may carry information such as a measurement type (for example, an RSRP, an RSRQ, an RSTD, a UTRAN TDD P-CCPCH RSCP, or a UTRAN FDD CPICH), a measurement period, and the number of frequencies.

S1702. The S-RRC network element invokes a C1 interface to send the measurement report of the UE to an RNMF network element.

For example, the RNMF network element may include an Nmmf_Communication_UEMessageTransfer service.

S1703. The RNMF network element determines, based on the measurement report of the UE that is reported by the S-RRC network element, that handover processing needs to be performed on the UE, and further determines a target cell for the handover.

The RNMF network element may determine, based on the target ID, that the RRC network element needs to be changed, and the RNMF network element and an AMF network element do not need to be changed.

In an embodiment, the RNMF network element may determine a target RRC network element (that is, a T-RRC network element) based on the target ID.

S1704. If the RNMF network element cannot determine, in S1703, whether the AMF network element needs to be changed, the RNMF network element may send a service query request (NF service request) to an NRF network element, where a queried NF type is an AMF, and the NRF network element selects an AMF network element that can serve an area identified by the target ID.

S1705. The NRF network element returns an address of the selected and determined AMF (AMF IP address) to the RNMF network element.

For example, S1703 and S1704 may be optional operations, and are performed when whether a handover needs to be performed for the AMF network element needs to be determined.

S1706. The RNMF network element sends a handover indication (HO indication) of the UE to the S-RRC network element.

The HO indication indicates the S-RRC network element to send a handover request (HO request) of the UE to the RNMF network element. The HO indication carries the target cell identifier (target ID) for the handover.

S1707. The S-RRC network element invokes the C1 interface to send a handover request (HO request) of the UE to the RNMF network element.

The message may carry information such as the target ID, a UE ID, a GUAMI, and a UE context. For example, the UE context includes information such as a UE-AMBR, AS security information (a key (key)), a PDU session resource to be setup list, an RRC context, and a mobility restriction list. The PDU session resource to be setup list is configuration information of a PDU session that needs to be reestablished, and includes parameter information such as a PDU session ID, a PDU session resource AMBR, a UL NG-U address, a security indication, a PDU session type, and QoS.

If the RNMF network element does not store the UE context, the RNMF network element cannot determine, in S1705, whether the AMF address returned by the NRF network element is the same as an address of an AMF network element that previously serves the UE. In this case, the determining whether a handover needs to be performed for the AMF network element may be as follows: After receiving the HO request sent by the S-RRC network element, the RNMF network element may determine, based on the GUAMI in the message, whether the AMF network element identified by the GUAMI is the same as the AMF network element returned by the NRF network element in S1705.

S1708. When it is determined in S1707 or S1705 that the RNMF network element and the AMF network element do not need to be changed, the RNMF network element sends a handover request (HO Request) of the UE to the T-RRC network element determined in S1703.

If the T-RRC network element is not determined in S1703, the RNMF network element may determine the T-RRC network element based on the target ID in this operation, and send the handover request (HO Request) of the UE to the T-RRC network element, where the message may carry information such as the target ID, the UE ID, the GUAMI, and the UE context.

S1709. The T-RRC network element establishes an RRC context for the UE, allocates a DRB ID to a PDU session, selects a T-PDCP-C network element based on the target ID, and sends a PDU session resource setup message to the T-PDCP-C network element.

After the PDU session resource setup message is received, resource configuration related to the PDU session may be performed. The message carries the target ID, the UE ID, and the PDU session resource to be setup list (the parameter set includes information about a DRB ID corresponding to each PDU session).

S1710. The T-PDCP-C network element receives the handover request of the UE, and parses the PDU session resource to be setup list to obtain related parameter configuration information of the PDU session that is requested to be established. The T-PDCP-C network element selects and determines a T-PDCP-U network element, and sends a bearer context setup message to the T-PDCP-U network element.

The related parameter configuration information may include information such as the PDU session resource AMBR, the UL NG-U address, the PDU session type, the security indication, a QFI, and QoS flow level QoS parameters. In addition, the bearer context setup message may carry the DRB ID, the PDU session resource AMBR, the UL NG-U address (for example, the UL GTP TEID and IP address), and the security indication (a value of the security indication is "required", "preferred", or "not needed").

S1711. The T-PDCP-U network element allocates a downlink NG-U address (for example, a DL GTP TEID and IP address), an uplink (UL) PDCP-U TEID and IP address, and a forward GTP TEID and IP address, performs resource configuration based on the parameters in the request message, and returns a bearer context setup response message.

During resource configuration based on the parameters, the forward GTP TEID and IP are used for an S-PDCP-U network element to transmit, during handover processing, a user data packet that has not been sent to the UE, to the T-PDCP-U network element through the PDU session established with the T-PDCP-U network element for caching and forwarding.

For example, the bearer context setup response message may carry the DRB ID, the DL NG-U address (for example, the DL GTP TEID and IP address), the UL PDCP-U TEID and IP address, the forward GTP TEID and IP address, and a security result (a value of the security result is "performed" or "not performed").

If a plurality of DRBs need to be established, the PDCP-C network element needs to repeatedly perform S1714 and S1715, and a plurality of different PDCP-U network elements may be selected for different DRBs.

S1712. The T-PDCP-C network element sends a user context setup (UE context UE setup) request message to a T-DU network element, to perform resource configuration on the T-DU network element.

The message may carry the DRB ID, QoS, and a UL PDCP-U GTP TEID and IP address.

S1713. After completing the resource configuration, the T-DU network element returns a user context setup (UE context UE setup) response message to the T-PDCP-C network element.

The message is a handover request acknowledgement message. The message may carry the DRB ID, and a DL DU GTP TEID and IP address.

S1714. The T-PDCP-C network element returns a PDU session resource setup response to the T-RRC network element, to confirm that the resource configuration is completed.

The message may carry the PDU session ID, a DL NG-U address, and a forward GTP TEID and IP address.

S1715. The T-RRC network element returns a handover request acknowledgement message (HO Request Ack message) to the RNMF network element, where the handover request acknowledgement message carries the UE ID, a PDU session resource admitted list, and a target to source transparent container.

For example, the PDU session resource admitted list is information about a PDU session that is successfully handed over, and includes information such as a PDU session ID and data forwarding info from a target node (that is, the forward GTP TEID and IP address).

S1716. The RNMF network element returns a handover request acknowledgement (HO Request Ack) message to the S-RRC function network element.

S1717. The S-RRC network element determines that handover processing has been completed for the target cell, and sends a handover command (HO command) to the S-PDCP-C network element.

The HO command may carry the UE ID and the PDU session resource admitted list.

S1718. The S-PDCP-C network element notifies the S-PDCP-U network element of a bearer context modification of the PDU session that has been handed over, and sends related parameter information to the S-PCDP-U network element.

For example, the related parameter information may include forwarding tunnel address information (Forward GTP TEID and IP address), used to forward, to the T-PDCP-U network element based on the forwarding tunnel address (Forward GTP TEID and IP address), user data that has not been sent to the UE.

S1719. The S-PDCP-C network element sends a handover command (HO command) to the S-DU, and the S-DU forwards the handover command (HO command) to the UE.

The HO command instructs the UE to reconfigure an RRC network element to be synchronized to the target cell.

S1720. After completing synchronization processing, the UE returns a handover complete (HO complete) acknowledgement message to the T-RRC network element by using the T-DU network element or the T-PDCP-C network element, and the T-RRC network element forwards the HO complete acknowledgement message to the RNMF network element, to confirm that handover processing on a RAN side is completed.

S1721. The RNMF network element sends a path switching request to a core network side. For example, the RNMF network element invokes, through an R2 interface, a path update service (Path switch) provided by the AMF network element.

It can be understood that the downlink user plane routing information (DL NG-U address) (for example, the DL GTP TEID and IP address) of the target PDCP-U network element may be sent to the AMF network element.

S1722. The AMF network element indicates the SMF network element to initiate PDU session update processing. In an embodiment of this operation, refer to S1323 to S1325 in the example 4. Details are not described herein again.

It should be noted that the RNMF network element may update the PDU session by indirectly performing sending an updated PDU session to the SMF network element by using the AMF network element. However, because the RNMF network element may access a DORE service-based bus through the R2 interface, the RNMF network element may directly send a PDU session establishment request to the SMF network element. For details, refer to the related descriptions in the example 4 or the example 5. Details are not described herein again.

It can be learned that, in the communication method used in an embodiment, the RNMF network element that includes the C1 interface and the R2 interface is introduced, so that a handover can be simply and efficiently performed for each function network element in the RAN, so as to overcome problems such as low efficiency and a relatively long delay of information transmission due to relatively complex and redundant protocol processing when information is transmitted between an access network element and a core network element through protocol processing, and provide a wireless network communication method with relatively high information transmission efficiency and a relatively short transmission delay, so that the wireless network communication method can flexibly adapt to moving UE, thereby improving user experience.

Figure 18A:
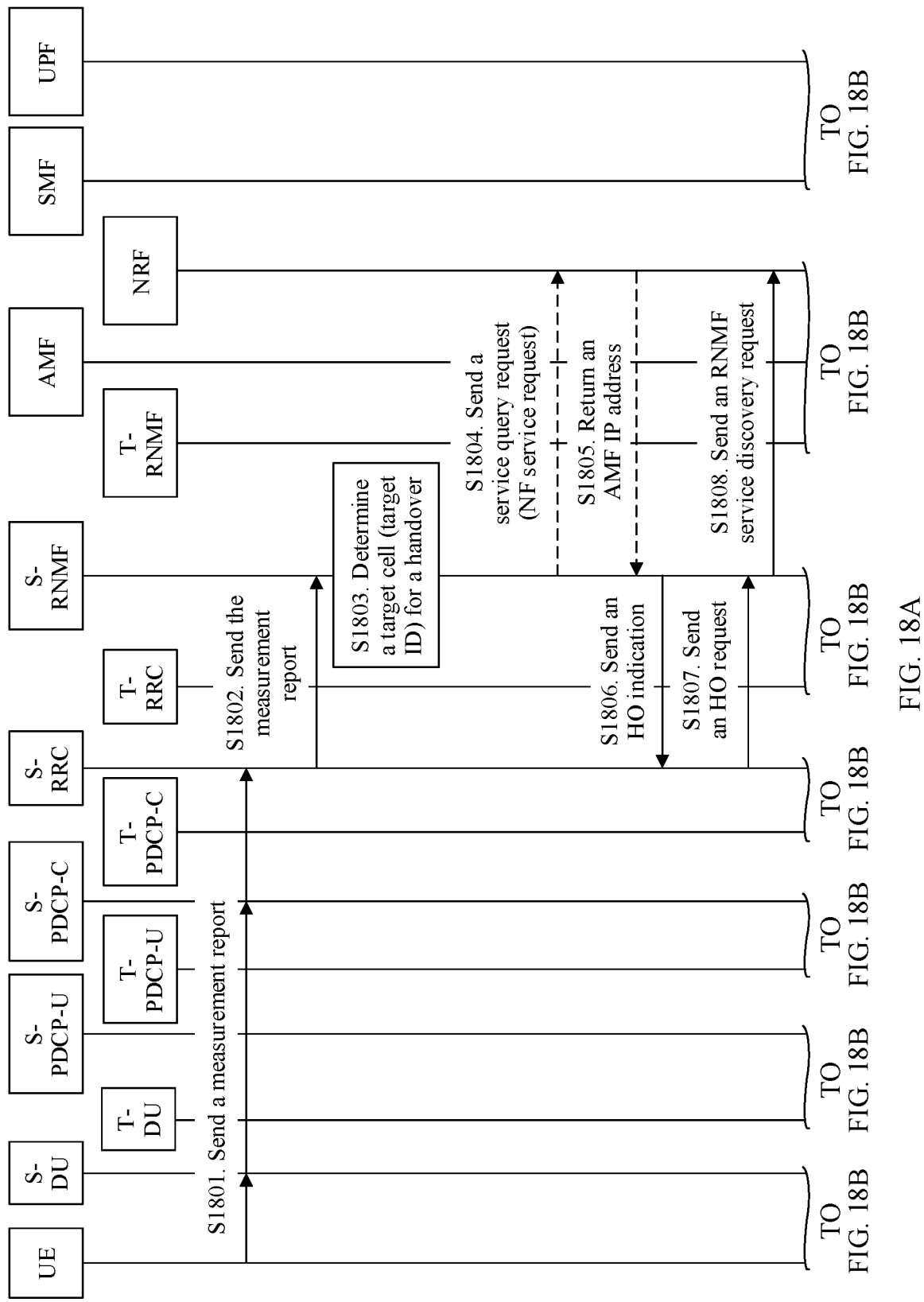
Figure 18C:
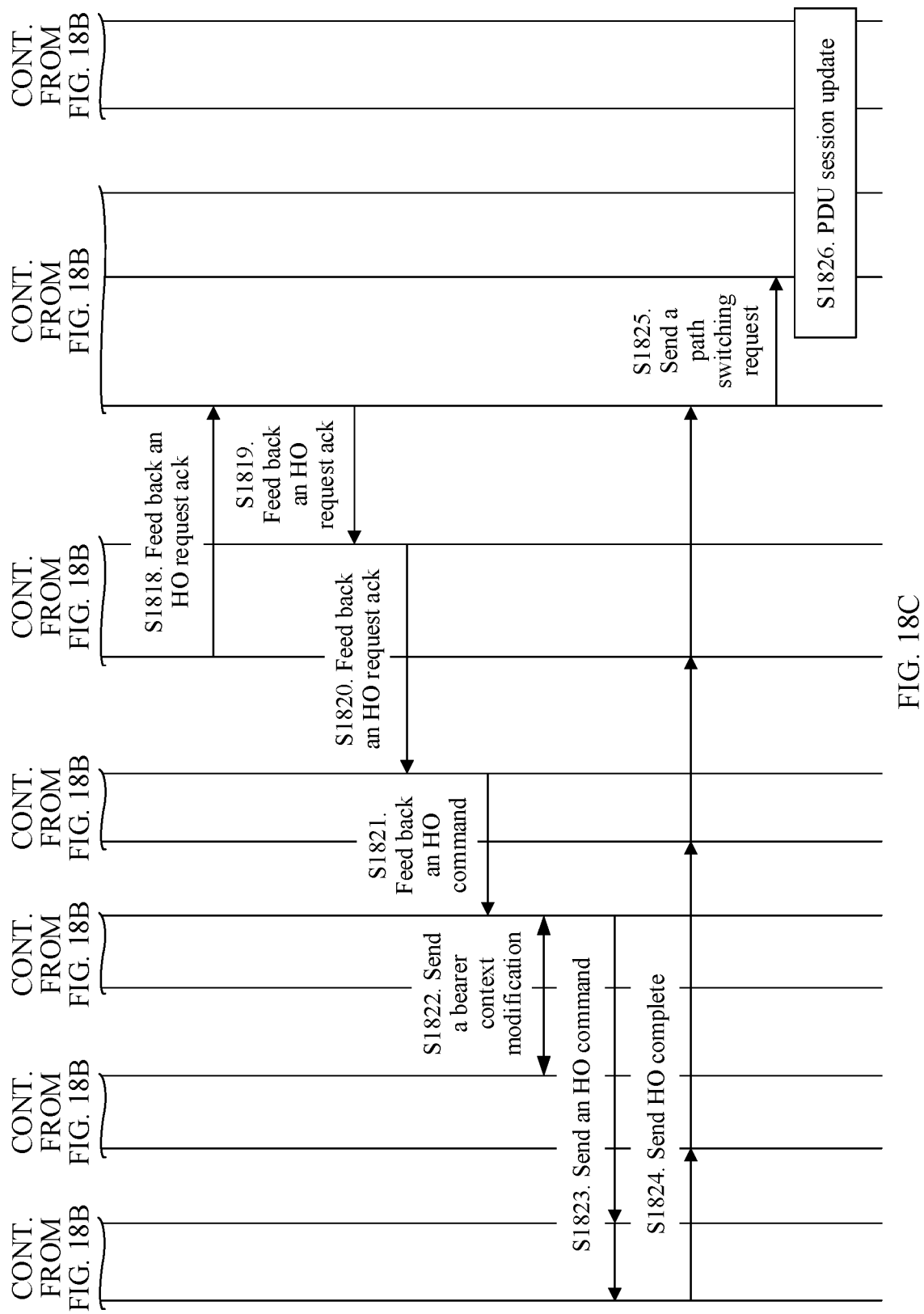

Example 7: A Scenario of a Handover for Each Function Network Element in a RAN and an RNMF Network Element If an RNMF network element determines that each function network element in a RAN and the RNMF network element currently cannot serve an area identified by a target ID, but an AMF network element can still serve the area, with reference to a communication method shown in FIG. 18A to FIG. 18C, the RNMF network element may indicate to initiate a handover for each function network element in the RAN and a handover for the RNMF network element. For example, a source radio network management function network element is an S-RNMF network element, a target radio network management function network element is a T-RNMF network element, a source access network element is an S-RRC network element, and a target access network element is a T-RRC network element. The scenario may include the following operations.

For details about S1801 and S1802, refer to S1701 and S1702 in the example 6. Details are not described herein again.

S1803. The S-RNMF network element determines, based on the measurement report reported by the S-RRC network element, that handover processing needs to be performed on the UE, and further determines a target cell for the handover. The RNMF network element determines, based on the target ID, that the RRC network element and the RNMF network element need to be changed, and an AMF network element does not need to be changed.

In an embodiment, the RNMF may select and determine a T-RRC network element based on the target ID.

For details about S1804 to S1807, refer to S1704 to S1707 in the example 6.

S1808. The S-RNMF network element initiates an RNMF service discovery request to an NRF network element, and performs querying by using the target ID, a RAT type (a current access standard of the UE), and PLMN information.

S1809. The NRF network element selects a matching RNMF network element based on the information in the request of the S-RNMF network element, and returns an RNMF IP address to the S-RNMF network element as a target RNMF network element (that is, a T-RNMF network element).

S1810. The S-RNMF network element sends a handover request (HO request) message to the corresponding T-RNMF network element based on the RNMF IP address.

The message may carry the information obtained in S1807 and an S-RNMF ID.

S1811. The T-RNMF network element selects and determines a T-RRC network element based on the target ID, the RAT type (the current access standard of the UE), and the PLMN information, and sends a handover request (HO request) message to the T-RRC network element.

The message may carry the information obtained in S1807 and a T-RNMF ID.

For details about S1812 to S1818, refer to S1709 to S1715 in the example 6.

S1819. After confirming that handover processing for the target cell is completed, the T-RNMF network element returns a handover request acknowledgement (HO request ack) message to the S-RNMF network element.

For details about S1820 to S1824, refer to S1716 to S1720 in the example 6.

For details about S1825 and S1826, refer to S1721 and S1722 in the example 6.

It should be noted that the T-RNMF network element may update the PDU session by indirectly sending a PDU session establishment request to the SMF network element by using the AMF network element. However, because the T-RNMF network element may access a DORE service-based bus through the R2 interface, the T-RNMF network element may directly send a PDU session establishment request to the SMF network element. For details, refer to the related descriptions in the example 4 or the example 5. Details are not described herein again.

It can be learned that, in the communication method used in an embodiment, the RNMF network element that includes the C1 interface and the R2 interface is introduced, so that a handover can be simply and conveniently implemented for each function network element in the RAN and the RNMF network element, so as to overcome problems such as low efficiency and a relatively long delay of information transmission due to relatively complex and redundant protocol processing when information is transmitted between an access network element and a core network element through protocol processing, and provide a wireless network communication method with relatively high information transmission efficiency and a relatively short transmission delay, so that the wireless network communication method can flexibly adapt to moving UE, thereby improving user experience.

Figure 19A:
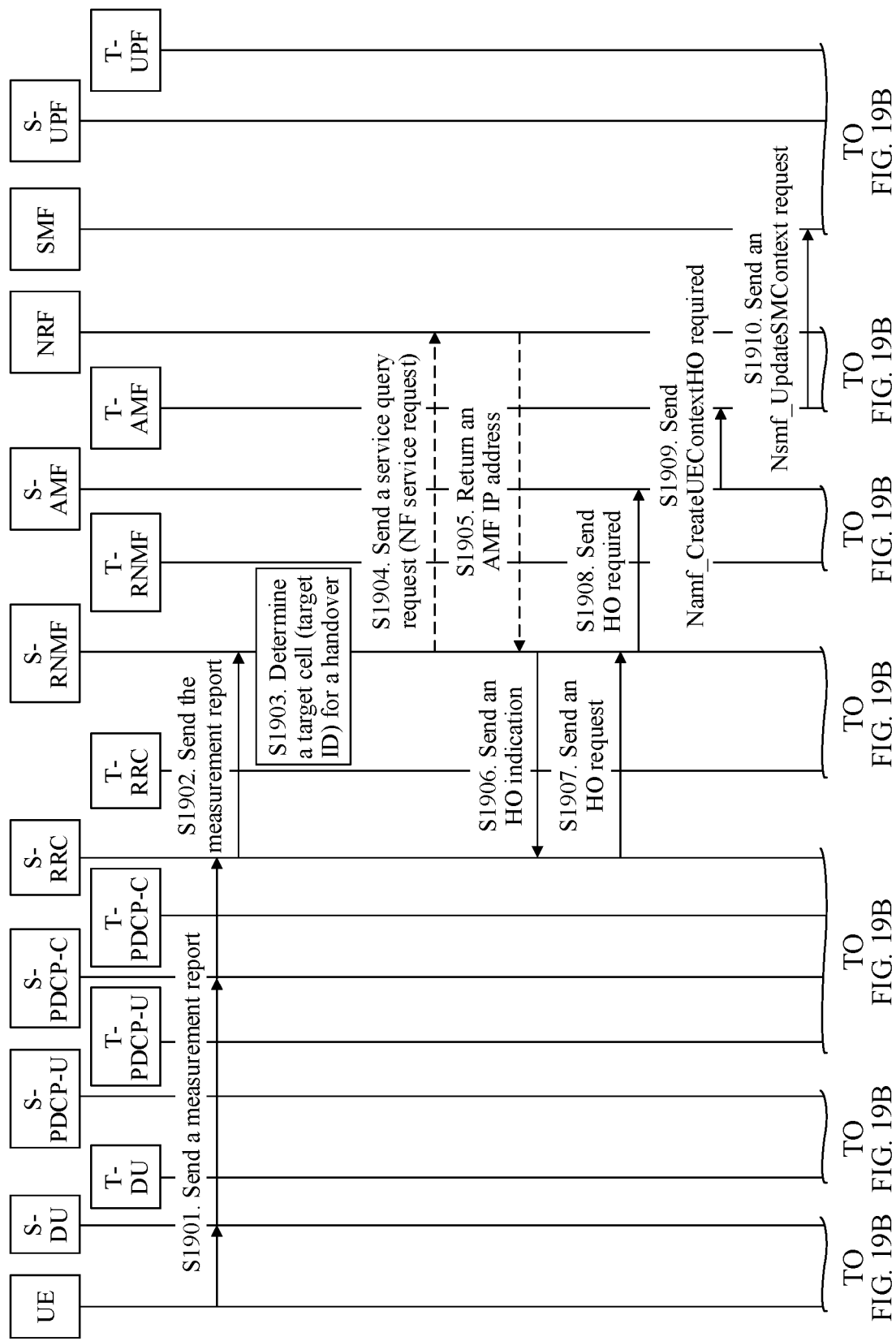
FIG. 19A to FIG. 19C are a signaling flowchart of an example 8 of a communication method in a wireless network according to an embodiment of this application.
Figure 19B:
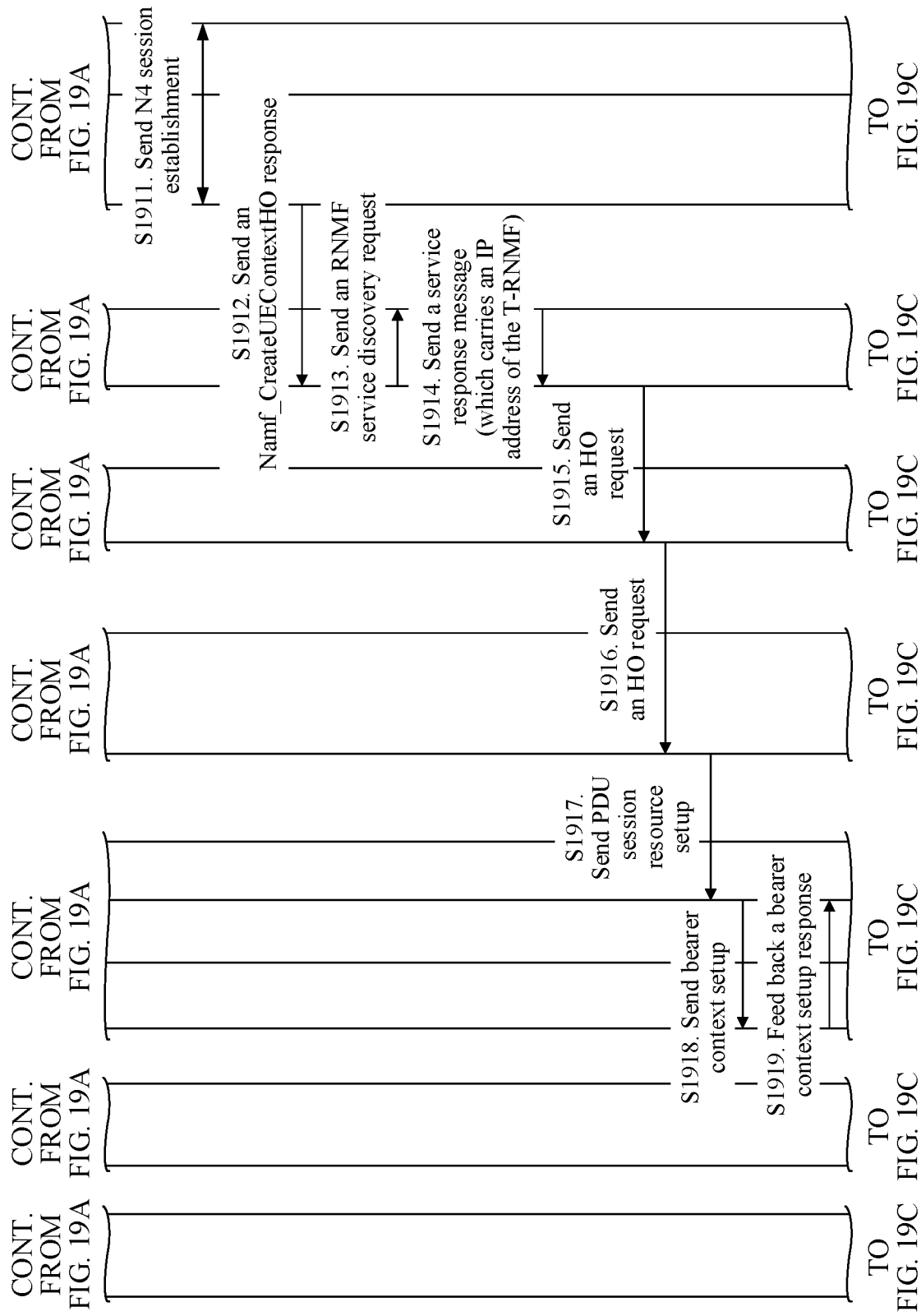
Figure 19C:
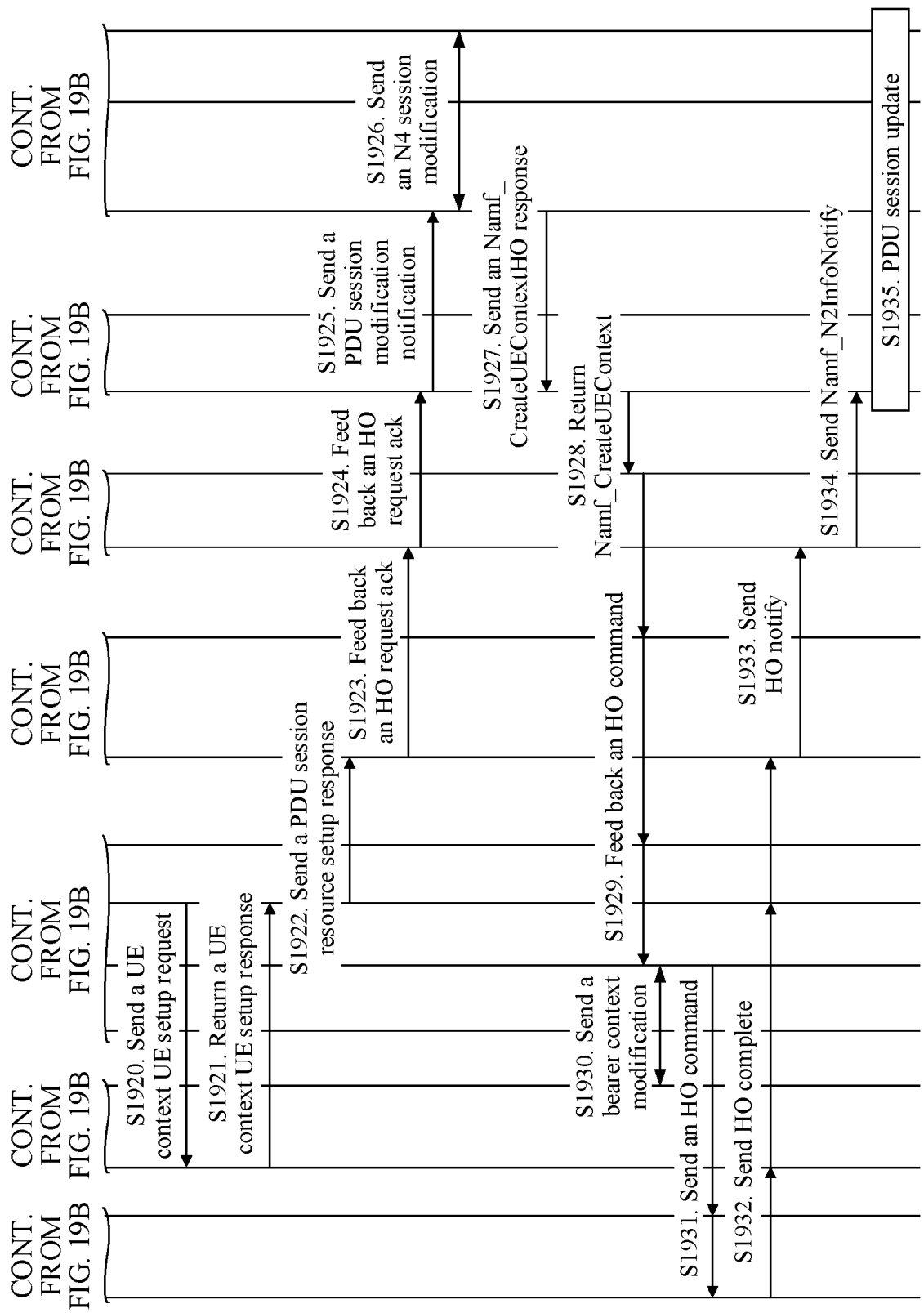

Example 8: A Scenario of a Handover for an RRC Function Network Element, an RNMF Network Element, and an AMF Network Element If an RNMF network element determines that each function network element in a RAN, the RNMF network element, and an AMF network element currently cannot serve an area identified by a target ID, with reference to a communication method shown in FIG. 19A to FIG. 19C, the RNMF network element may indicate to initiate a handover for each function network element in the RAN, a handover for the RNMF network element, and a handover for the AMF network element. For example, a source radio network management function network element is an S-RNMF network element, a target radio network management function network element is a T-RNMF network element, a source access network element is an S-RRC network element, a target access network element is a T-RRC network element, a source core network element is an S-AMF network element, and a target core network element is a T-AMF network element. The scenario may include the following operations.

For details about S1901 and S1902, refer to S1701 and S1702 in the example 6. Details are not described herein again.

S1903. The S-RNMF network element determines, based on the measurement report reported by the S-RRC network element, that handover processing needs to be performed on the UE, and further determines a target cell for the handover. The RNMF determines, based on the target ID, that the RRC network element, the RNMF network element, and the AMF network element need to be changed.

For example, the RNMF network element may select and determine a T-RRC network element based on the target ID.

For details about S1904 to S1907, refer to S1704 to S1707 in the example 6.

S1908. The S-RNMF network element invokes a service of the AMF network element to initiate a handover requirement (HO required) to the S-AMF network element.

S1909. The S-AMF network element invokes an Namf_CreateUEContext service of an SMF network element to request the T-AMF network element to create a context for the UE and establish a user plane data transfer path, where the message may carry the target ID and the parameter information in S1908.

S1910 to S1912. The T-AMF network element creates a UE context, and invokes a service of the SMF network element to trigger establishment of a PDU session and establishment of an indirect forwarding tunnel in a handover process.

S1913. The T-AMF network element initiates an RNMF service discovery request to an NRF network element, and performs querying by using the target ID, a RAT type (a current access standard of the UE), and PLMN information.

S1914. The NRF network element selects a matching RNMF network element based on the information in the request of the T-AMF network element, and returns an RNMF IP address to the S-RNMF.

S1915. The T-AMF network element sends a handover request (HO request) message to the corresponding T-RNMF network element based on the RNMF IP address.

The message may carry a PDU session setup list, a UE ID (including a PDU session ID), handover request transfer, an HO restriction list, a security context (including UE security capabilities, a security key, and a KAMF change indicator), and a T-AMF ID.

S1916. The T-RNMF network element selects and determines a T-RRC network element based on the target ID, the RAT type (the current access standard of the UE), and the PLMN information, and sends a handover request (HO request) message to the T-RRC network element.

The message may carry a T-RNMF ID.

For details about S1917 to S1923, refer to S1709 to S1715 in the example 6. Details are not described herein again.

S1924. After confirming that handover processing for the target cell is completed, the T-RNMF network element returns a handover request acknowledgement (HO request ack) message to the T-AMF network element.

S1925 to S1927. The T-AMF network element initiates PDU session update processing, and notifies a T-UPF network element of downlink user plane tunnel information. For details, refer to S1723 to S1725 in the example 6. Details are not described herein again.

S1928. After completing UE handover processing, the T-AMF network element returns an Namf_CreateUEContext message to the S-AMF, to confirm that processing of a target network is completed.

For details about S1929 to S1932, refer to S1717 to S1720 in the example 6. Details are not described herein again.

S1933. When receiving an HO acknowledgement (HO Complete) message from the UE, the T-RRC network element notifies the T-RNMF network element that the handover is completed, and reports location information of the UE to a network.

S1934. The T-RNMF network element invokes an Namf_N2InfoNotify service of the AMF network element to notify the T-AMF network element that the user has been handed over.

S1935. When receiving a handover complete acknowledgement from the T-RNMF network element, the T-AMF network element notifies the SMF network element or the UPF network element that the UE has been handed over, and sends a handover complete indication (Handover Complete indication) to the SMF.

It can be learned that, in the communication method used in an embodiment, the RNMF network element that includes the C1 interface and the R2 interface is introduced, so that a handover can be simply and conveniently implemented for each network element in the RAN, the RNMF network element, and the AMF network element, so as to overcome problems such as low efficiency and a relatively long delay of information transmission due to relatively complex and redundant protocol processing when information is transmitted between an access network element and a core network element through protocol processing, and provide a wireless network communication method with relatively high information transmission efficiency and a relatively short transmission delay, so that the wireless network communication method can flexibly adapt to moving UE, thereby improving user experience.

In the foregoing embodiments provided in this application, the solutions of the communication method provided in the embodiments of this application are described from a perspective of each network element and a perspective of interaction between network elements. It can be understood that, to implement the foregoing functions, network elements and devices, such as the radio access network device, the access and mobility management function network element, the user equipment, the data management function network element, and the network slice selection function network element, include corresponding hardware structures and/or software modules for performing the functions. One of ordinary skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. One of ordinary skilled in the art may use different methods to implement the described functions for each particular application, but it should not be considered that the embodiment goes beyond the scope of this application.

Figure 20:
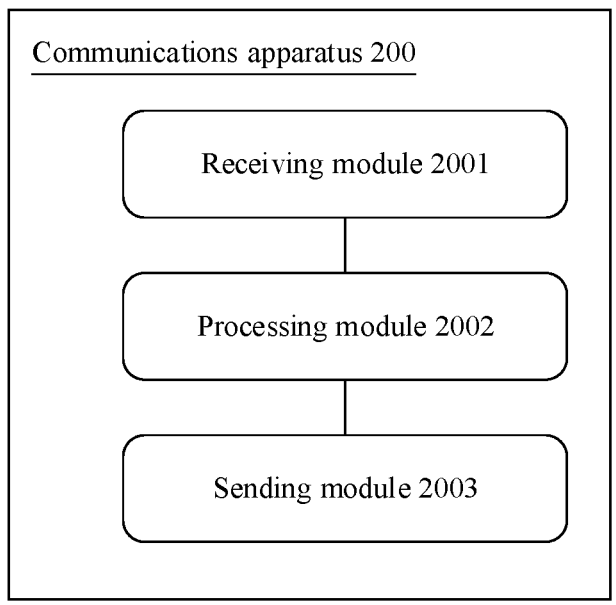
FIG. 20 is a schematic structural diagram of a communications apparatus according to an embodiment of this application.

For example, when the foregoing network elements implement corresponding functions by using software modules, FIG. 20 shows a communications apparatus according to an embodiment of this application. The communications apparatus 200 may include a receiving module 2001, a processing module 2002, and a sending module 2003.

In an embodiment, the communications apparatus may be configured to perform the operations of the first radio network management function network element in FIG. 4. An example is as follows.

The receiving module 2001 is configured to receive information about a first access network element from the first access network element. The processing module 2002 is configured to drive to perform service invocation with a first core network element through a first service-based interface, and drive to perform service invocation with the first access network element through a second service-based interface. The sending module 2003 is configured to perform service invocation with the first access network element through the second service-based interface based on the information about the first access network element. The information about the first access network element includes any one or more of the following information: an identifier of the first access network element, a routing address of the first access network element, a public land mobile network PLMN served by the first access network element, an identifier of a cell served by the first access network element, and a radio access type RAT supported by the first access network element.

In this way, the first radio network management function network element that provides a service-based interface can be introduced in the communications apparatus provided in an embodiment of the application, so that wireless network communication between an access network element and a core network element is simply and conveniently implemented, so as to overcome problems such as low efficiency and a relatively long delay of information transmission due to relatively complex and redundant protocol processing when information is transmitted between the access network element and the core network element through protocol processing, and provide a wireless network communications apparatus with relatively high information transmission efficiency and a relatively short transmission delay.

In an embodiment, the sending module 2003 in the apparatus is further configured to send any one or more of the following information to a network repository function network element: an identifier of the first radio network management function network element, a routing address of the first radio network management function network element, a PLMN served by the first radio network management function network element, an identifier of a cell served by the first radio network management function network element, and a RAT supported by the first radio network management function network element.

In an embodiment, the processing module 2002 in the apparatus is further configured to determine the network repository function network element based on configuration information in the first radio network management function network element; or the processing module 2002 is further configured to determine the network repository function network element by querying a domain name system server.

In an embodiment, the receiving module 2001 in the apparatus is further configured to receive user equipment measurement information from a second access network element, where the second access network element serves user equipment; the processing module 2002 is further configured to determine a target network element based on the user equipment measurement information; the receiving module 2001 is further configured to receive user equipment context information from the second access network element; and the sending module 2003 is configured to send the user equipment context information to the target network element. The target network element may be a third access network element, a second radio network management function network element, or a second core network element.

In an embodiment, if the target network element is the second radio network management function network element or the second core network element, the processing module 2002 is configured to: determine the target network element based on the user equipment measurement information by using the configuration information in the first radio network management function network element; or determine the target network element based on the user equipment measurement information by querying the network repository function network element.

In addition, the receiving module 2001, the processing module 2002, and the sending module 2003 in the network slice-based communications apparatus may further implement another operation or function of the first radio network management function network element in the foregoing method. Details are not described herein again.

Figure 21:
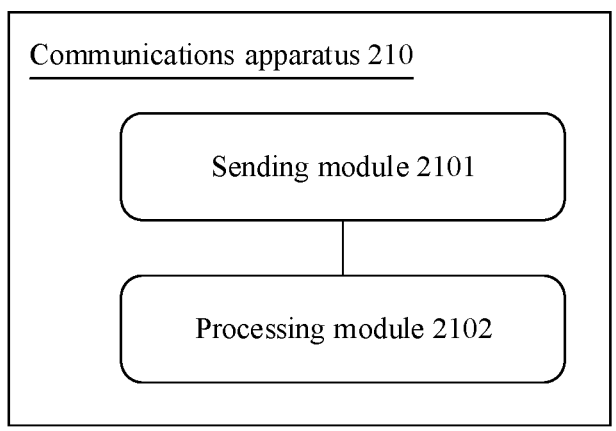
FIG. 21 is a schematic structural diagram of another communications apparatus according to an embodiment of this application.

In another embodiment, FIG. 21 further shows a schematic structural diagram of a communications apparatus. The communications apparatus 210 provided in an embodiment of the application may be further configured to perform the operations of the access network element (for example, the RRC network element) in FIG. 4. An example is as follows.

A sending module 2101 is configured to send information about the access network element to a radio network management function network element, where the information about the access network element is used by the radio network management function network element to perform service invocation with the access network element through a second service-based interface. A processing module 2102 is configured to drive the radio network management function network element to support performing service invocation with a core network element through a first service-based interface, and drive the radio network management function network element to perform service invocation with the access network element through the second service-based interface.

In an embodiment, the information about the access network element includes any one or more of the following information: an identifier of the access network element, a routing address of the access network element, a public land mobile network PLMN served by the access network element, an identifier of a cell served by the access network element, and a radio access type RAT supported by the access network element.

In an embodiment, the processing module 2102 in the apparatus is further configured to determine the radio network management function network element based on configuration information in the access network element; or the processing module 2102 is further configured to determine the radio network management function network element by querying a domain name system DNS server.

In an embodiment, the apparatus may further include a receiving module, configured to receive user equipment measurement information from user equipment; and the sending module 2101 is further configured to send the user equipment measurement information to the radio network management function network element.

In addition, the sending module 2101 and the processing module 2102 in the network slice-based communications apparatus may further implement another operation or function of the access network element in the foregoing method. Details are not described herein again.

Figure 22:
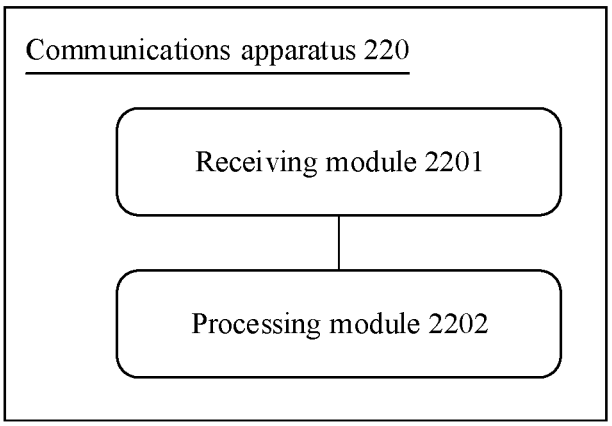
FIG. 22 is a schematic structural diagram of still another communications apparatus according to an embodiment of this application.

In still another embodiment, FIG. 22 further shows a schematic structural diagram of a communications apparatus. The communications apparatus 220 provided in an embodiment of the application may be further configured to perform the operations of the network repository function network element (for example, the NRF network element) in FIG. 4. An example is as follows.

A receiving module 2201 is configured to receive information about a first radio network management function network element from the first radio network management function network element. A processing module 2202 is configured to drive, based on the information about the first radio network management function network element, to perform service invocation with the first radio network management function network element through a first service-based interface. The first radio network management function network element supports a function of performing service invocation with an access network element through a second service-based interface. The information about the first radio network management function network element includes any one or more of the following information: an identifier of the first radio network management function network element, a routing address of the first radio network management function network element, a PLMN served by the first radio network management function network element, an identifier of a cell served by the first radio network management function network element, and a RAT supported by the first radio network management function network element.

In an embodiment, the processing module 2202 in the apparatus is further configured to find, for the first radio network management function network element through querying, a target network element that serves user equipment. The target network element may be a second radio network management function network element or a second core network element.

In addition, the receiving module 2201 and the processing module 2202 in the network slice-based communications apparatus may further implement another operation or function of the network repository function network element in the foregoing method. Details are not described herein again.

Figure 23:
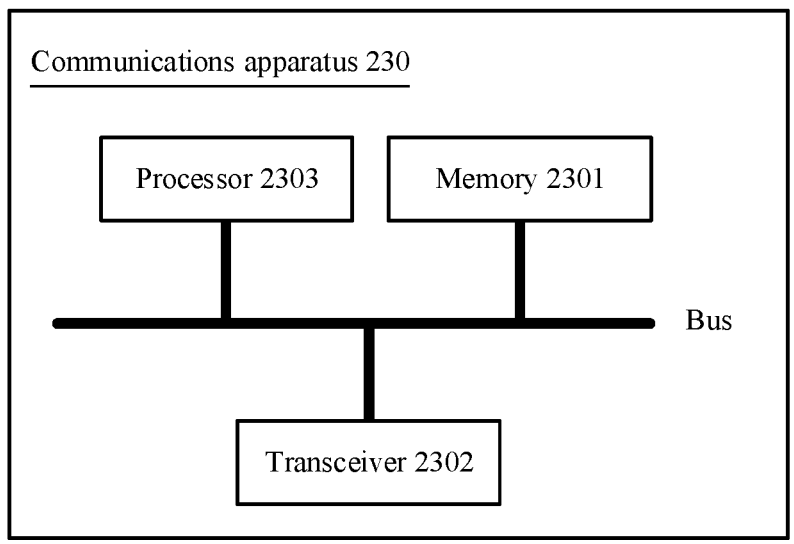
FIG. 23 is a schematic structural diagram of a communications apparatus according to an embodiment of this application.

FIG. 23 is another possible schematic structural diagram of the communications apparatus in the foregoing embodiments. The communications apparatus 230 includes a memory 2301, a transceiver 2302, and a processor 2303, as shown in FIG. 23. The memory 2301 is configured to be coupled to the processor 2303, and stores a computer program necessary for the communications apparatus 230.

For example, in an embodiment, the processor 2303 is configured to perform another operation or function of the first radio network management function network element. The transceiver 2302 is configured to implement communication between the communications apparatus 230 and the first access network element and between the communications apparatus 230 and the first core network element.

In another embodiment, the processor 2303 is configured to perform another operation or function of the first access network element. The transceiver 2302 is configured to implement communication between the communications apparatus 230 and the first radio network management function network element and between the communications apparatus 230 and the first core network element.

In still another embodiment, the processor 2303 is configured to perform another operation or function of the network repository function network element. The transceiver 2302 is configured to implement communication between the communications apparatus 230 and the first access network element and between the communications apparatus 230 and the first radio network management function network element.

The controller/processor configured to perform the foregoing communications device in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Method or algorithm operations described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. Additionally, the ASIC may be located in a radio access network device. Certainly, the processor and the storage medium may exist in the device as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The objectives, technical solutions, and benefits of the present application are further described in detail in the foregoing embodiments. It should be understood that the foregoing descriptions are merely embodiments of the present application, but are not intended to limit the protection scope of the present application. Any modification, equivalent replacement, or improvement made within the spirit and principle of the present application shall fall within the protection scope of the present application.

What is claimed is:

1. A communication method, comprising:
receiving, by a first radio network management function network element, information about a first access network element from the first access network element, wherein the first radio network management function network element supports a function of performing service invocation with a first core network element through a first service-based interface; and
performing, by the first radio network management function network element, service invocation with the first access network element through a second service-based interface based on the information about the first access network element, wherein the first service-based interface and the second service-based interface are different interfaces, and the first service-based interface and the second service-based interface are used for realizing communication between the first access network element and the first core network element.

2. The method of claim 1, wherein the information about the first access network element comprises at least one of: an identifier of the first access network element, a routing address of the first access network element, a public land mobile network (PLMN) served by the first access network element, an identifier of a cell served by the first access network element, or a radio access type (RAT) supported by the first access network element.

3. The method of claim 1, further comprising:
sending, by the first radio network management function network element to a network repository function network element, at least one of: an identifier of the first radio network management function network element, a routing address of the first radio network management function network element, a PLMN served by the first radio network management function network element, an identifier of a cell served by the first radio network management function network element, or a RAT supported by the first radio network management function network element.

4. The method of claim 3, further comprising:
determining, by the first radio network management function network element, the network repository function network element based on configuration information in the first radio network management function network element; or
determining, by the first radio network management function network element, the network repository function network element by querying a domain name system server.

5. The method of claim 1, further comprising:
receiving, by the first radio network management function network element, user equipment measurement information from a second access network element that serves user equipment;
determining, by the first radio network management function network element, a target network element based on the user equipment measurement information;
receiving, by the first radio network management function network element, user equipment context information from the second access network element; and sending, by the first radio network management function network element, the user equipment context information to the target network element.

6. The method of claim 5, wherein the target network element is a third access network element, a second radio network management function network element, or a second core network element.

7. The method of claim 6, wherein if the target network element is the second radio network management function network element or the second core network element, the determining the target network element based on the user equipment measurement information comprises:
  determining, by the first radio network management function network element, the target network element based on the user equipment measurement information by using configuration information in the first radio network management function network element; or
  determining, by the first radio network management function network element, the target network element based on the user equipment measurement information by querying a network repository function network element.

8. A communication method, comprising:
  sending, by an access network element, information about the access network element to a radio network management function network element that supports a function of performing service invocation with a core network element through a first service-based interface, wherein the information about the access network element is used by the radio network management function network element to perform service invocation with the access network element through a second service-based interface; and
  performing, by the access network element, service invocation with the radio network management function network element through the second service-based interface, wherein the first service-based interface and the second service-based interface are different interfaces, and the first service-based interface and the second service-based interface are used for realizing communication between the access network element and the core network element.

9. The method of claim 8, wherein the information about the access network element comprises at least one of: an identifier of the access network element, a routing address of the access network element, a public land mobile network (PLMN) served by the access network element, an identifier of a cell served by the access network element, or a radio access type (RAT) supported by the access network element.

10. The method of claim 8, further comprising:
  determining, by the access network element, the radio network management function network element based on configuration information in the access network element;
  or
  determining, by the access network element, the radio network management function network element by querying a domain name system (DNS) server.

11. The method of claim 8, further comprising:
  receiving, by the access network element, user equipment measurement information from user equipment; and
  sending, by the access network element, the user equipment measurement information to the radio network management function network element.

12. A communication method, comprising:
  receiving, by a network repository function network element, information about a first radio network management function network element from the first radio network management function network element; and
  performing, by the network repository function network element, service invocation with the first radio network management function network element through a first service-based interface based on the information about the first radio network management function network element,
  wherein the first radio network management function network element supports a function of performing service invocation with an access network element through a second service-based interface, wherein the first service-based interface and the second service-based interface are different interfaces.

13. The method of claim 12, wherein the information about the first radio network management function network element comprises at least one of: an identifier of the first radio network management function network element, a routing address of the first radio network management function network element, a PLMN served by the first radio network management function network element, an identifier of a cell served by the first radio network management function network element, or a RAT supported by the first radio network management function network element.

14. The method of claim 12, further comprising:
  finding, by the network repository function network element through querying for the first radio network management function network element, a target network element that serves user equipment.

15. The method of claim 14, wherein the target network element is a second radio network management function network element or a second core network element.

* * * * *